US00RE39171E

(19) United States
(12) Reissued Patent
Lochtefeld

(10) Patent Number: US RE39,171 E
(45) Date of Reissued Patent: Jul. 11, 2006

(54) SIMULATED WAVE WATER SCULPTURE

(75) Inventor: Thomas J. Lochtefeld, La Jolla, CA (US)

(73) Assignee: Light Wave, LTD, Reno, NV (US)

(21) Appl. No.: 09/848,972

(22) Filed: May 4, 2001

Related U.S. Patent Documents

Reissue of:
(64) Patent No.: 5,899,634
Issued: May 4, 1999
Appl. No.: 08/735,418
Filed: Oct. 22, 1996

(51) Int. Cl.
*A63B 69/00* (2006.01)

(52) U.S. Cl. ..... 405/79; 239/17
(58) Field of Classification Search ..... 405/79, 405/52, 21; 4/491; 472/128, 13, 82; 239/17, 239/23, 20
See application file for complete search history.

(56) References Cited

U.S. PATENT DOCUMENTS

| | | | | |
|---|---|---|---|---|
| 159,959 | A | | 2/1875 | Parker |
| 490,484 | A | * | 1/1893 | Mackaye |
| 586,718 | A | * | 7/1897 | Wharton |
| 883,485 | A | | 3/1908 | Ridgway |
| 1,019,405 | A | | 3/1912 | Atwood |
| 1,076,779 | A | | 10/1913 | Miller et al. |
| 1,701,842 | A | * | 2/1929 | Fisch |
| 1,871,215 | A | * | 8/1932 | Keller et al. |
| 2,268,932 | A | | 1/1942 | Gatewood |
| 2,301,267 | A | | 11/1942 | Gatewood |
| 3,473,334 | A | * | 10/1969 | Dexter |
| 3,557,559 | A | * | 1/1971 | Barr |
| 3,562,823 | A | * | 2/1971 | Koster |
| 3,598,402 | A | * | 8/1971 | Frenzl |
| 3,613,264 | A | | 10/1971 | Vitka et al. |
| 3,802,697 | A | * | 4/1974 | Le Mehaute |

(Continued)

FOREIGN PATENT DOCUMENTS

| | | | | |
|---|---|---|---|---|
| EP | 0298853 | * | 1/1989 | |
| WO | 9006790 | * | 6/1990 | ..... 405/79 |

OTHER PUBLICATIONS

"The Flow Rider", Independent Professional Survey. *BIM Internatioinal Magazine*, vol. 2, #4.*
"These Waves Win Raves", On The Scene, *Sports Illustrated*.*
"Surfing Motion . . . Miles From the Ocean," *National Geographic World*, Jul. 1994.*
"Flow Rider FunDamentals"—Wave Loch brochure.*
"A Stationary Oblique Breaking Wave For Laboratory Testing of Surfboards", H.G. Hornung and P. Killen. Department of Physics, School of General Studies, Australian National University, Canberra. May 7, 1976.*
"Model Studies for a Wave Riding Facility," P.D. Killen, University of Queensland, Aug. 1980.*
"A Facility For Wave Riding Research," P.D. Killen and R.J. Stalker, Department of Mechanical Engineering University of Queensland, St. Lucia, QLD. 4067 Australia. Nov./Dec. 1980.*
"The Wave," Jim Dunn, Jan. 1992.*

*Primary Examiner*—Frederick L. Lagman
(74) *Attorney, Agent, or Firm*—Knobbe, Martens, Olson & Bear, LLP

(57) ABSTRACT

A water sculpture is provided having a an upwardly inclined flow surface. A flowing body of water is caused to flow upon the flow surface simulating various desired wave shapes. A variety of aesthetic wave shapes can be created, such as an unbroken wave face, a white water bore, a spilling breaking wave, or a tunnel wave. In one embodiment a walk-through water sculpture is provided such as for an entranceway of a building or the like.

80 Claims, 17 Drawing Sheets

U.S. PATENT DOCUMENTS 3,913,332 A * 10/1975 Forsman
4,002,333 A 1/1977 Gotoh
4,258,912 A 3/1981 Reighart, II
4,339,122 A * 7/1982 Croul
4,564,190 A * 1/1986 Frenzl
4,792,260 A * 12/1988 Sauerbier
4,836,521 A 6/1989 Barber
4,905,987 A * 3/1990 Frenzi
4,954,014 A * 9/1990 Sauerbier et al.
4,955,540 A * 9/1990 Fuller et al.
5,005,762 A * 4/1991 Cacoub ..... 239/23
5,096,467 A 3/1992 Matsui
5,115,973 A * 5/1992 Fuller et al. ..... 239/20
5,171,101 A * 12/1992 Sauerbier et al.
5,213,547 A 5/1993 Lochtefeld
5,236,280 A * 8/1993 Lochtefeld
5,271,692 A * 12/1993 Lochtefeld ..... 405/79
5,342,145 A * 8/1994 Cohen ..... 4/491
5,387,159 A * 2/1995 Hilgert et al.
5,393,170 A * 2/1995 Lochtefeld ..... 405/79
5,401,117 A * 3/1995 Lochtefeld
5,433,671 A 7/1995 Davis
5,453,196 A 9/1995 Tuszko et al.
5,482,510 A 1/1996 Ishii et al.
5,503,597 A 4/1996 Lochtefeld et al.
5,556,340 A 9/1996 Bohn et al.
5,564,859 A * 10/1996 Lochtefeld ..... 405/79
5,616,083 A 4/1997 Subbaraman et al.
5,628,584 A 5/1997 Lochtefeld
5,738,590 A 4/1998 Lochtefeld
6,036,603 A * 3/2000 Mason et al. ..... 472/65

* cited by examiner

FIG. 11A
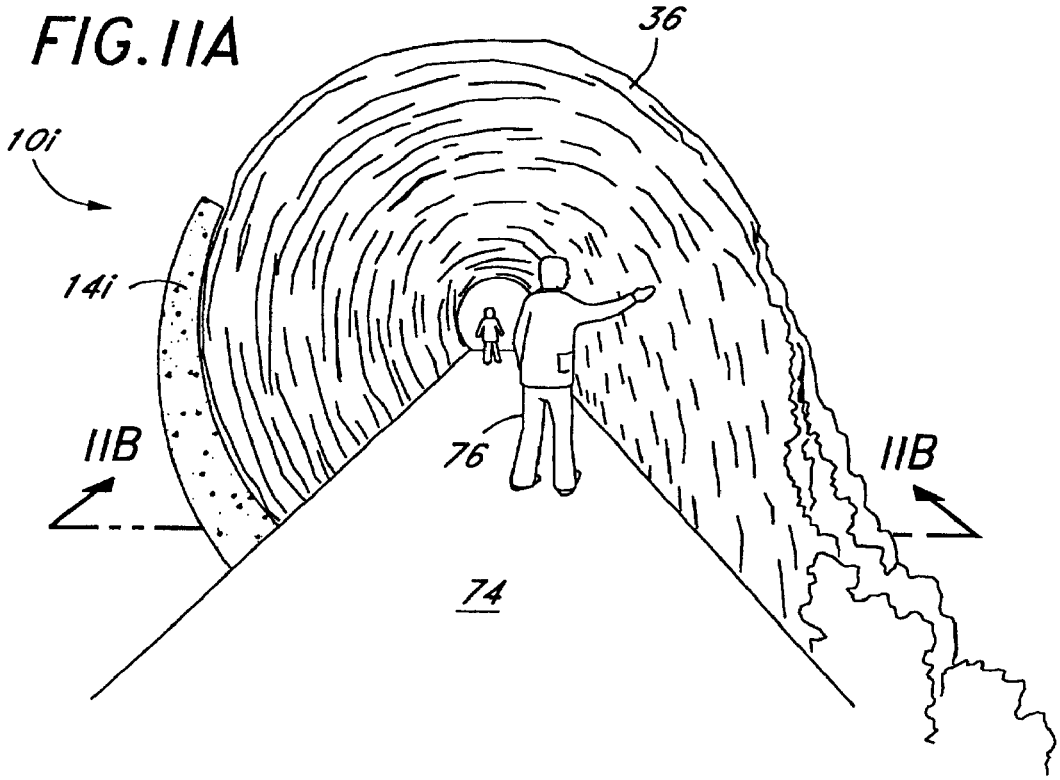
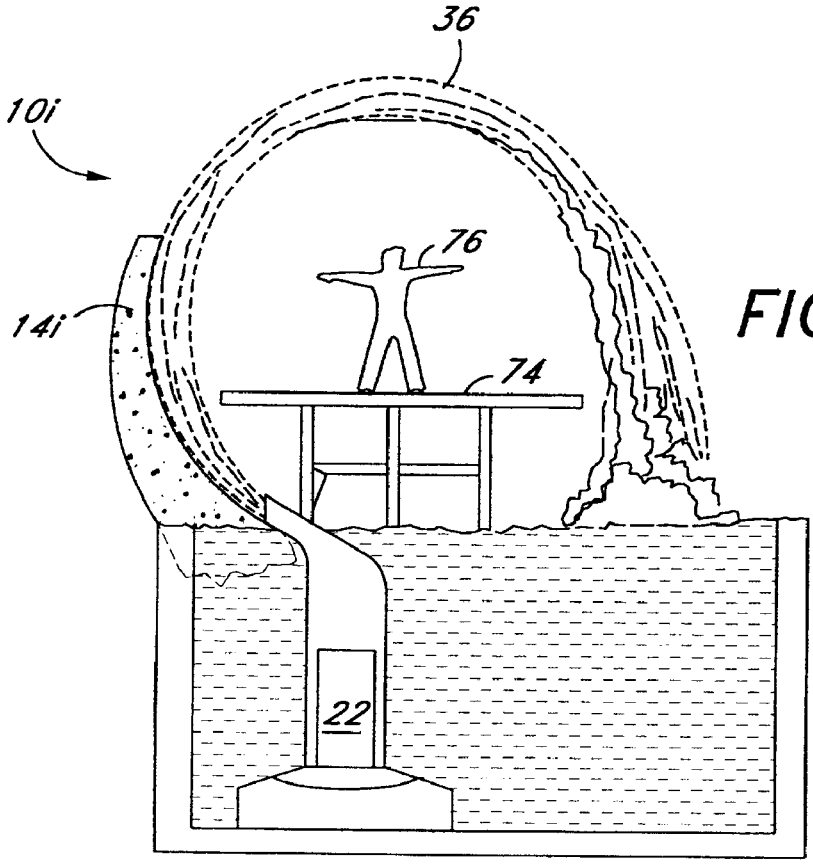
FIG. 11B

SIMULATED WAVE WATER SCULPTURE

Matter enclosed in heavy brackets [ ] appears in the original patent but forms no part of this reissue specification; matter printed in italics indicates the additions made by reissue.

BACKGROUND OF THE INVENTION

1. Field of the Invention The present invention relates in general to the formation of water sculptures, and, more particularly, to a method and apparatus for providing a flowing body of water on an inclined surface to produce simulated wave shapes for aesthetic purposes such as for water fountains, water sculptures and the like.

2. Description of the Related Art

The concept of using water to create shapes of aesthetic beauty can broadly be categorized in the field of water sculpture. Examples of water sculpture can be seen in water fountains, water geysers and man-made or simulated rivers and waterfalls. These types of sculptures demonstrate numerous possibilities for creating different aesthetic water shapes. For instance, in the case of a man-made river, water can be shaped by being directed over and around various obstacles such as rocks. Water can also be made to fall from heights, as in waterfalls and fountains. Certain fountains may employ streams of water projecting upward or outward at different velocities, angle and volumes to create unique and appealing shapes, configurations or patterns.

Despite the many approaches to forming water sculptures, there have been relatively few attempts to create realistic-looking wave-like shapes or wave-forms. Of the several attempts that have been made, most have focused on natural propagating waves, i.e., waves that simulate conditions naturally found on beaches and elsewhere in the environment. Natural propagating wave simulation, however, is not ideal for the formation of water sculptures due to the need for a deep water source. Because water sculptures typically must operate in a limited amount of space using only limited amounts of water, deep water propagation would be inappropriate for many such sculptures. Further, the use of deep water creates problems of cost, size and capacity. Specifically, the reproduction of natural propagating waves in deep water requires expensive water containment and wave generating equipment.

SUMMARY OF THE INVENTION

The present invention overcomes many of the limitations of the prior art by providing a method and apparatus for producing natural-looking waves under shallow water conditions. In particular, a water sculpture is provided that can produce several types of wave forms occurring in a natural deep-water environment, but without the costs or space requirements associated with deep water wave propagation. Examples of such natural wave forms include: (1) undulating, unbroken waves; (2) breaking waves forming a white water bore; (3) curling or spilling waves; and (4) tube or tunnel waves.

The invention generally involves the use of a flow surface over which a relatively shallow flow or "sheet flow" of water is injected by a nozzle or other suitable means. The term sheet flow is a convenient term to describe water flow that follows the general contours of a flow surface. It should not be construed as limiting in any way the scope or application of the present invention. The flow surface is generally inclined, but in other respects may have a contour that is widely varied. It may also be tilted or declined if desired. For instance, the surface may be symmetrical, asymmetrical, planar, convex, concave, canted about its longitudinal axis, and/or provided with mounds, shapes, forms, or other contours in order to produce a wave of a particular shape or aesthetic appeal. Advantageously, by providing a flow of water over an appropriately formed surface, wave-like shapes simulating an unbroken wave face, a white water bore, a spilling breaking wave, a breaking tunnel wave or other desired wave shapes can be created.

In accordance with one embodiment the present invention provides a water sculpture comprising a flow surface with at least a portion thereof having a generally inclined slope. A source of water is provided for injecting a sheet flow of water onto the flow surface such that the sheet flow of water flows upwardly onto the inclined slope and substantially conforms to the contours thereof. The flow surface is formed such that it causes at least a portion of the sheet flow of water to separate from the flow surface producing a simulated wave form.

In accordance with another embodiment the present invention provides an apparatus for forming a water sculpture, comprising a flow surface with at least a portion thereof having a generally inclined slope. A flow source is provided injecting a shallow flow of water onto the flow surface such that the shallow flow of water flows upwardly onto the inclined slope and substantially conforms to the contours thereof. The flow surface further comprises an upwardly rising section sized and configured so as to induce separation of the shallow flow of water on said upwardly rising section, whereby at least a portion of the water flow assumes an airborne trajectory producing visual, aural and/or aesthetic appeal.

In accordance with another embodiment the present invention provides a water awning for a building or the like comprising a tunnel wave water sculpture forming a sheet flow of water which assumes a trajectory over a walkway or entranceway.

In accordance with another embodiment the present invention provides a walkthrough water sculpture comprising a platform or walkway for allowing pedestrians or vehicles to traverse a predetermined distance and a flow surface disposed adjacent to the walkway and having a generally inclined slope. A flow source is provided for injecting a sheet flow of water onto the flow surface such that the sheet flow of water flows upwardly onto the inclined slope and substantially conforms to the contours thereof. The flow surface further comprises an upwardly rising section sized and configured so as to induce separation of the sheet flow on the upwardly rising section, whereby at least a portion of the sheet flow of water assumes an airborne trajectory over the walkway.

In accordance with another embodiment the present invention provides a water sculpture, comprising a contoured inclined flow surface and one or more flow sources for providing a flow of water onto the inclined flow surface, such that the flow substantially conforms to the contours of the flow surface. The flow surface further comprises an upwardly rising section sized and configured so as to induce separation of the flow of water on the upwardly rising section, whereby at least a portion of the flow of water assumes a path or trajectory that simulates a naturally occurring wave form.

These and other features and advantages of the present invention will be readily apparent to those skilled in the art having reference to the drawings and detailed description that follows, the invention not being limited to any particular preferred embodiment(s) described.

BRIEF DESCRIPTION OF THE DRAWINGS

FIGS. 11A and 11B are perspective and front elevational cross-section views, respectively, of an alternative embodiment of a tunnel wave awning water sculpture having features in accordance with the present invention;

DETAILED DESCRIPTION OF THE PREFERRED EMBODIMENTS

Figure 1A:
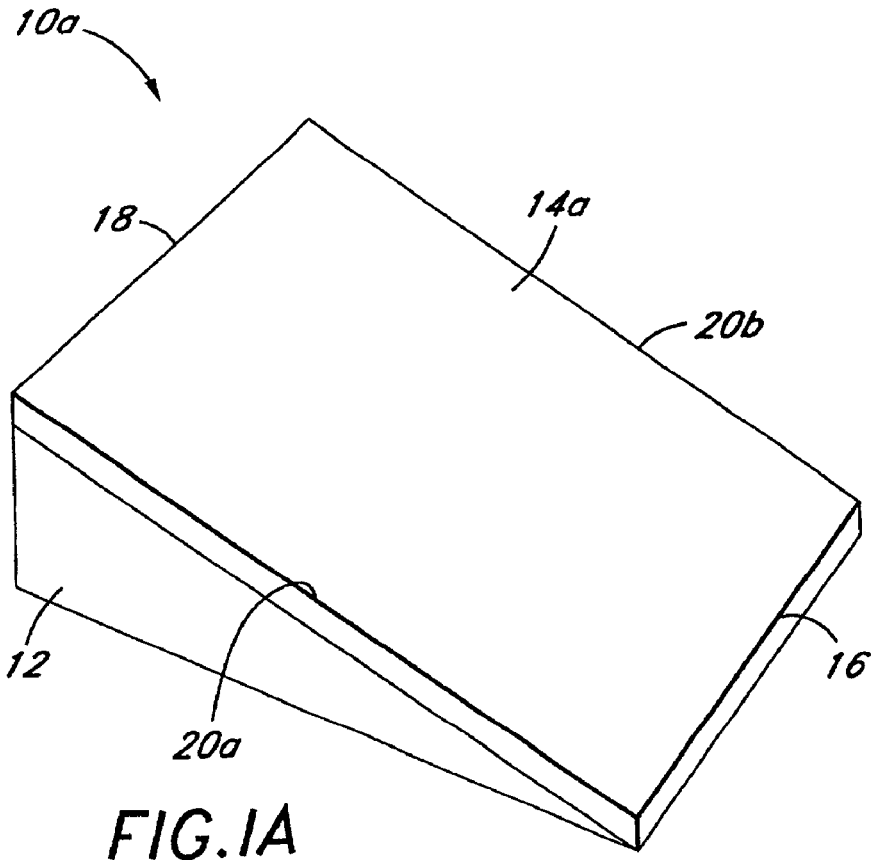
FIGS. 1A and 1B are perspective views of two types of sheet flow water sculptures having features in accordance with the present invention.

My U.S. Pat. No. 5,236,280 first disclosed the concept of simulated surfing wave forms in a shallow or "sheet flow" water environment. One purpose of creating these wave shapes was to reproduce desired conditions in which surfers and other ride participants could wave-ride on simulated waves and thereby perform exciting new water-skimming maneuvers over a sustained period of time. My U.S. Pat. No. 5,401,117 further expanded this concept by providing a method and apparatus for containerless sheet flow which produced improved wave shapes for performing surfing maneuvers.

The present invention further improves and expands on this fundamental concept of producing simulated wave shapes by forming new and unique water sculptures having visual, aural and/or aesthetic appeal. This adaptation leads to some unique applications, such as an awning for an entranceway to a building, or an indoor breaking wave water sculpture to complement a surfing or beach theme. The overall result is the creation of a wide variety of desirable wave-shapes that can be used generally in water fountains and other applications intended for visual, aural or aesthetic appeal.

Definitions

To better understand the preferred construction and operation of the invention as described herein, a few special terms are defined below. However, it should be pointed out that these explanations are intended to supplement the ordinary meaning of such terms, and are not intended to be limiting in any way.

A stationary wave is a progressive wave that is travelling against the flow of water and has a phase speed that exactly matches the speed of the current, thus, allowing the wave to appear stationary.

The equilibrium zone is that portion of an upward inclined flow surface upon which an actual or hypothetical object may be maintained in equilibrium on an upward flowing body of water. Consequently, the upslope flow of momentum as communicated to the object through hydrodynamic drag is balanced by the downslope component of gravity associated with the weight of the object.

The supra-equidyne area is that portion of a flow surface contiguous with but downstream of the equilibrium zone wherein the slope of the incline is sufficiently steep to allow an object to overcome the drag force associated with the upwardly sheeting water flow and slide downwardly thereupon.

The sub-equidyne area is that portion of a flow surface contiguous with but upstream of the equilibrium zone wherein the slope of the incline is either insufficiently steep, flat or declined such that the drag force associated with the water flow causes an object to move in the direction of flow and ultimately back up the incline in opposition to the downslope component of gravity.

Of course, those persons skilled in the art will recognize that the terms equilibrium, supra-equidyne and sub-equidyne, as used herein, are relative terms and may vary depending upon the size, shape, weight and drag coefficient of the actual or hypothetical object placed in the flowing body of water. Nevertheless, they are useful and convenient terms for describing the general characteristics of various flow supporting surfaces as disclosed herein.

The Froude number is a mathematical expression that describes the ratio of the velocity of the flow to the phase speed of the longest possible waves that can exist in a given depth without being destroyed by breaking. The Froude number equals the flow velocity divided by the square root of the product of the acceleration of gravity and the depth of the water. The Froude number squared is a ratio between the kinetic energy of the flow and its potential energy, i.e., the Froude number squared equals the flow speed squared divided by the product of the acceleration of gravity and the water depth. In formula notation, the Froude number may be represented by the following mathematical expression:

$$F = \frac{v}{\sqrt{gd}}$$

where:

v=flow velocity in ft/sec g=acceleration due to gravity in ft/sec$^2$ d=depth of the sheet water flow in ft.

Critical flow occurs when the flow's kinetic energy and gravitational potential energy are equal. Critical flow has the characteristic physical feature of a breaking phenomenon or a hydraulic jump resulting from a local convergence of energy. Because of the unstable nature of wave breaking, critical flow is difficult to maintain in an absolutely stationary state in a moving stream of water given that the speed of the wave must match the velocity of the stream to remain stationary. This is a delicate balancing act. There is a match for these exact conditions at only one point for one particular flow speed and depth. Critical flows have a Froude number equal to one.

Subcritical flow can be generally described as a slower moving water flow. Specifically, subcritical flows have a Froude number that is less than 1, and the kinetic energy of the flow is less than its gravitational potential energy. If a stationary wave is in subcritical flow, then it will be a non-breaking stationary wave.

Supercritical flow can be generally described as faster moving water flow. Specifically, supercritical flows have a Froude number greater than 1, and, thus, the kinetic energy of the flow is greater than its gravitational potential energy. No stationary waves are involved. The reason for the lack of stationary waves is that neither breaking nor non-breaking waves can keep up with the flow speed because the maximum possible speed for any wave is the square root of the product of the acceleration of gravity times the water depth. Consequently, any waves which might form are quickly swept downstream.

The hydraulic jump is the point of wave-breaking of the fastest waves that can exist at a given depth of water. The hydraulic jump itself is actually the break point of that wave, resulting from a local convergence of energy. Any waves occurring upstream of the hydraulic jump in the supercritical area are unable to keep up with the flow. Consequently they bleed downstream until they meet the area where the hydraulic jump occurs. At that point, the flow is thicker and the waves can travel faster. Concurrently, the downstream waves that can travel faster move upstream and meet at the hydraulic jump. The convergence of waves at this flux point leads to wave breaking. In terms of energy, the hydraulic jump is an energy transition point where energy of the flow abruptly changes from kinetic to potential. A hydraulic jump occurs when the Froude number is 1.

White water breaking occurs due to wave breaking at the leading edge of the hydraulic jump where the flow transitions from critical to subcritical. In the sheet flow environment, remnant turbulence and air bubbles from wave breaking are merely swept downstream through the subcritical area, and dissipate within a short distance downstream of the hydraulic jump.

A bore is a progressive hydraulic jump which can appear stationary in a current when the bore speed is equal and opposite to the current.

Separation is the point where the sheet flow breaks away from the flow surface. Flow separation results from differential losses of kinetic energy through the depth of the sheet flow. As the sheet flow proceeds up the incline it begins to decelerate, trading kinetic energy for gravitational potential energy. The portion of the sheet flow that is directly adjacent to the walls of the incline (the boundary layer) also suffers additional kinetic energy loss to wall friction. These additional friction losses cause the boundary layer to run out of kinetic energy and come to rest in a state of zero wall friction while the outer portion of the sheet flow still has residual kinetic energy left. At this point the outer portion of the sheet flow breaks away from the wall of the incline (separation) and continues on a ballistic trajectory with its remaining energy forming either a spill down or curl over back upon the upcoming flow. The separating streamline is the path taken by the outer portion of the sheet flow which does not come to rest under the influence of frictional effects, but breaks away from the wall surface at the point of separation.

Flow partitioning is the lateral division of flows having different hydraulic states. A dividing streamline is the streamline defining the position of flow partitioning on the surface along which flows divide laterally between supercritical and critical hydraulic states.

Conforming flow occurs where the angle of incidence of the entire depth range of a body of water is (at a particular point relative to the inclined flow forming surface over which it flows) predominantly tangential to the flow surface. Consequently, conforming flow upon a flow surface will conform to gradual changes in inclination, e.g., curves, without causing the flow to separate. As a consequence of flow conformity, the downstream termination of an inclined surface will always physically direct and point a conforming flow in a direction aligned with the downstream termination surface. The change in direction of a conforming flow can exceed 180 degrees in some cases.

The following detailed disclosure and drawings set forth several particularly preferred embodiments of certain water sculptures having features and advantages in accordance with the preset invention. For convenience throughout the various examples, like numbers are used to refer to like elements. However, the use of the same or similar numbers in different figures should not in any way be interpreted as requiring identity of structure or function. Also, while water is the preferred flow medium those skilled in the art will readily appreciate that a wide variety of other suitable liquids may also be used, including without limitation colored liquids, liquid mixtures, and various beverages, such as champagne and the like.

Example 1

Basic Sheet Flow

FIG. 1A shows one embodiment of a simple water sculpture 10a having features of the present invention. Sectional lines as revealed in FIG. 1A are solely for the purpose of indicating the three-dimensional shape in general, and are not illustrative of a specific frame, plan, or profile sections. Rather, it should be noted that a wide variety of dimensions and configurations for the water sculpture 10a are compatible with the principles and teachings of the present invention. Therefore, these principles and teachings should not be construed to be limited to any particular configuration illustrated in the drawings or described herein.

The water sculpture 10a generally comprises a subsurface structural support 12 and a flow surface 14a, defined by upstream edge 16, downstream edge 18, and side edges 20a and 20b. The flow surface 14a is preferably smooth and can be a skin placed over the sub-surface structural support 12, or the structures can be integrated together, provided that the flow surface is sufficiently smooth. The flow surface 14a can be fabricated of any of several well known materials, e.g., plastic; foam; formed metal; stretched or reinforced tension fabric; treated wood; fiberglass; tile; fluid filled plastic or fabric bladders; or any other suitable materials having a sufficiently smooth outer surface and which will withstand the surface loads involved. Sub-surface structural support 12 can be sand/gravel/rock; truss and beam; thin shell concrete; compacted fill; tension pole; or any other suitable materials for firmly grounding and structurally supporting the flow surface 14a in a manner so as to receive flowing water thereon.

Figure 1B:
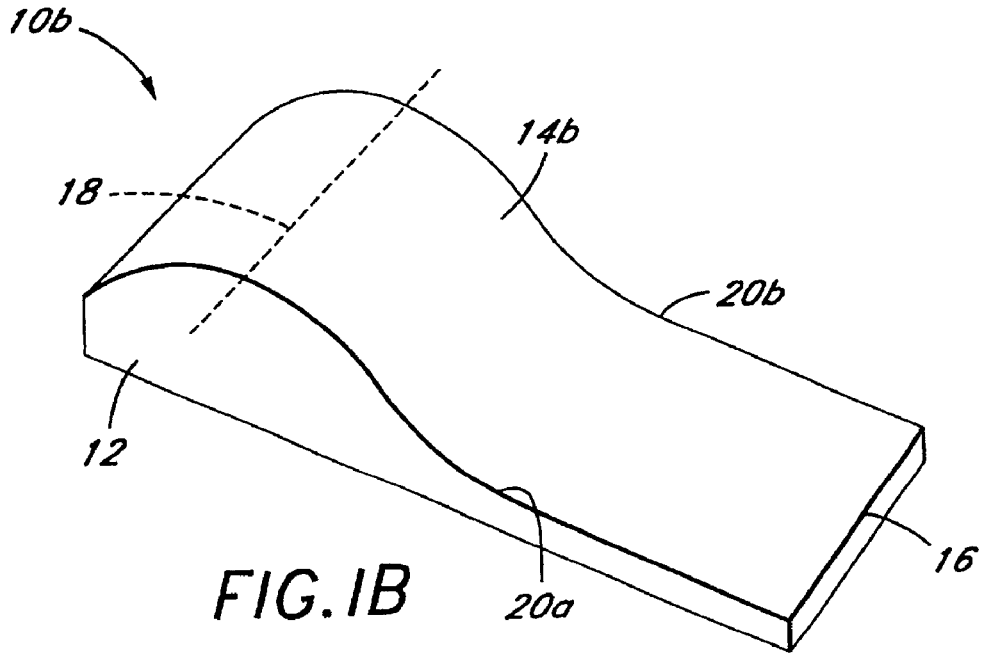

FIG. 1B shows an alternate embodiment of a water sculpture 10b having features in accordance with the present invention. In this case, the flow surface 14b has a generally concave curvature transitioning into a convex curvature defining a ridge line 18, as shown. Shaping of the flow surface 14b helps to determine the shape of the water flowing on the surface, as the water generally closely conforms to the contours of the flow surface 14b due to the nature of shallow water flow. Of course, many other shapes and configurations of the flow surface 14b may also be used such as a variety of straight, concave and convex curvatures, as will be explained below.

Figure 2:
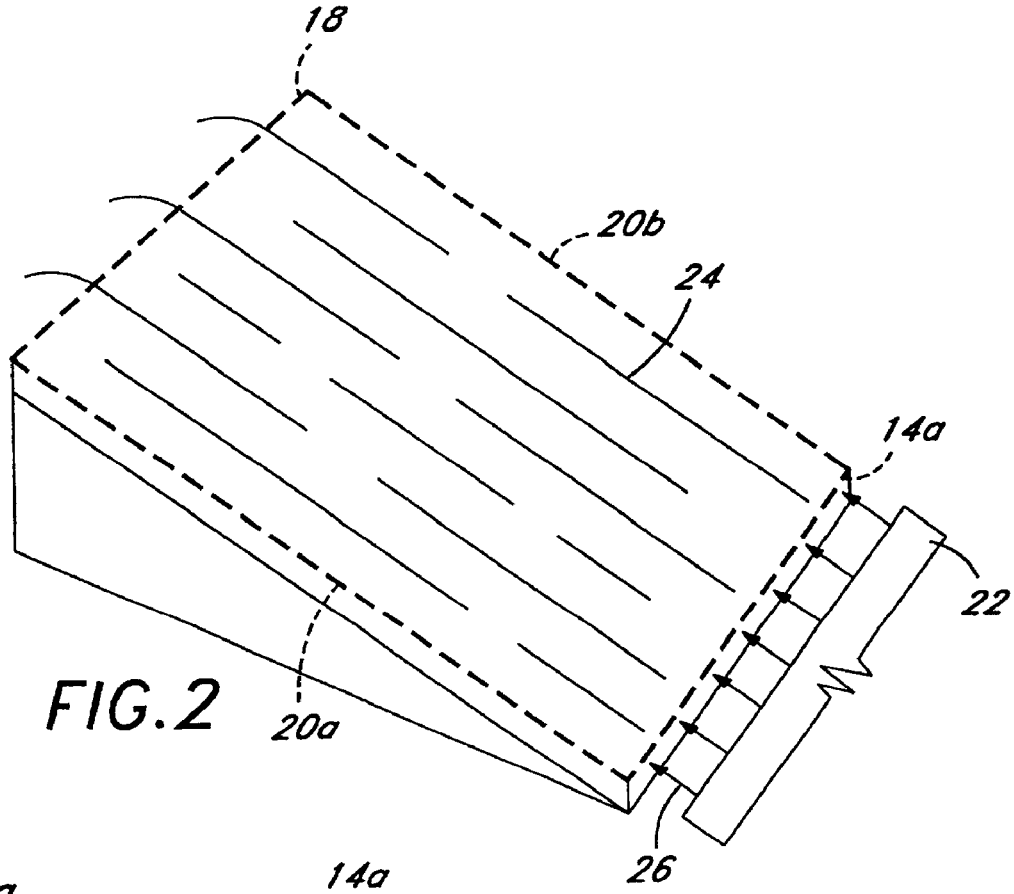
FIG. 2 is a schematic perspective view of the sheet flow water sculpture of FIG. 1A, illustrating a supercritical sheet flow of water thereon.

FIG. 2 is a schematic diagram illustrating sheet flow on the flow surface 14a of FIG. 1A. The flow surface 14a is generally inclined upwards. A flow source 22 (e.g., pump, fast moving stream or elevated dam/reservoir or nozzle) forms a supercritical flow of water 24 in a predominantly singular flow direction 26 (as indicated by arrows) over flow surface 14a to form an inclined flowing body of water. There is no minimum or maximum depth for supercritical flow 24, although shallow flows are preferred, with a practical minimum of approximately ½ cm. The depth of water will range preferably from about ½ to 40 centimeters. The preferred relation of flow depth to flow speed can be expressed in terms of a preferred Froude number. A practical regime of Froude numbers for water flow over surface 14a is from about 2 to about 75, with the preferred range being between about 4 and 25. Flows with Froude numbers less than 2 are prone to contamination from pulsating motions known as "roll waves" which are actually vortices rather than waves.

The flow surface 14a as shown and described in connection with FIGS. 1 and 2 can be used to simulate a variety of wave forms, such as a stationary, unbroken wave. Maintenance of this "unbroken" wave requires that the kinetic energy of supercritical flow 24 always exceed the potential energy downstream of the edge or ridge line 18.

Example 2

Simulated White Water Bore

Figure 3:
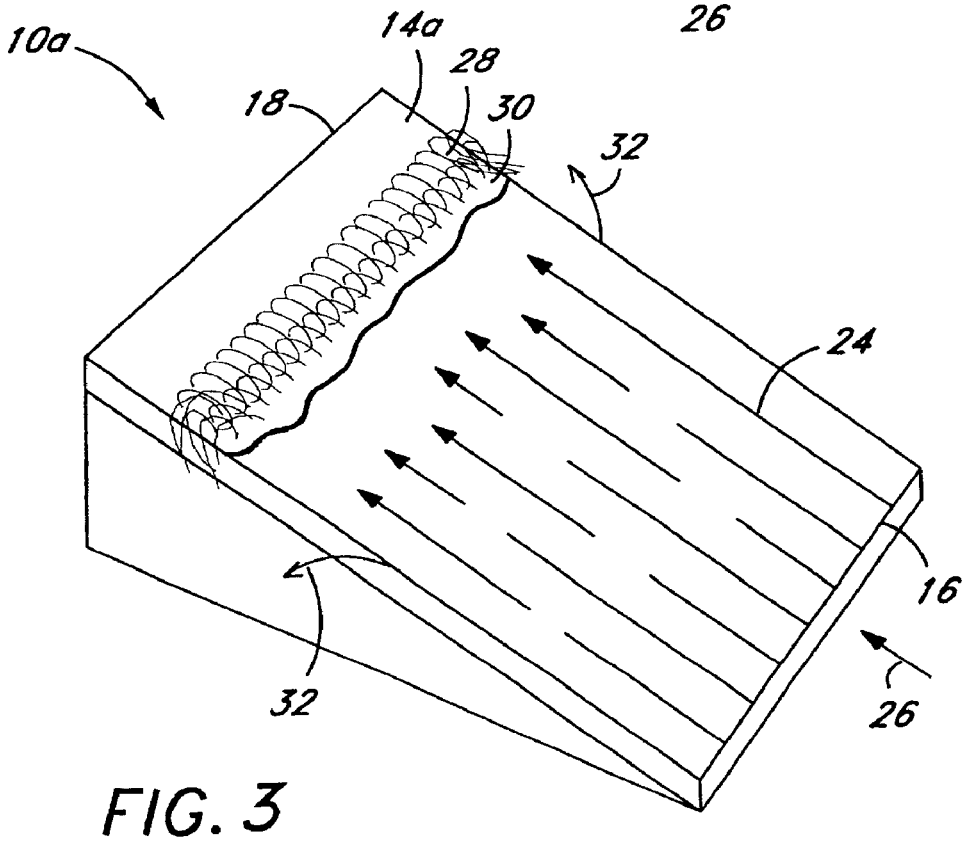
FIG. 3 is a perspective view of the sheet flow water sculpture of FIG. 1A, illustrating a critical sheet flow of water thereon forming a white water bore.

FIG. 3 illustrates a water sculpture 10 with a flow profile that simulates a stationary white water bore. When the velocity (i.e., kinetic energy) of an upwardly inclined supercritical sheet flow 24, moving in direction 26, is less than the gravitational potential energy downstream of the upper edge or ridge line 18, then sheet flow 24 will form a hydraulic jump 28 prior to reaching downstream ridge line 18. Accordingly, white water 30 will roll downward and to the side as run-off water 32, and, an effect similar to a stationary white water bore will form on the flow surface 14a. Maintenance of this hydraulic state requires that the kinetic energy of supercritical flow 24 always be less than the potential energy at the downstream edge or ridge line 18. The relative position of the hydraulic jump 28 will be determined by the velocity of the supercritical flow 24. The higher the velocity, the higher the position of the hydraulic jump 28 upon flow surface 14a.

Example 3

Simulated Spilling Wave

A simulated spilling wave with a smooth unbroken shoulder may be created on a flow surface by two general methods: (1) a cross-stream velocity gradient and (2) a cross-stream pressure gradient. The use of either method depends upon overall objectives and constraints of the flow surface structure and available flow characteristics. A cross-stream velocity gradient is the preferred method when the structure of the flow surface is limited to a symmetrical configuration such as flow surface 14a shown in FIG. 4A. A cross-stream pressure gradient is the preferred method when the initial supercritical flow 24 moving up the flow surface has constant velocity such as shown in FIG. 4B.

Figure 4A:
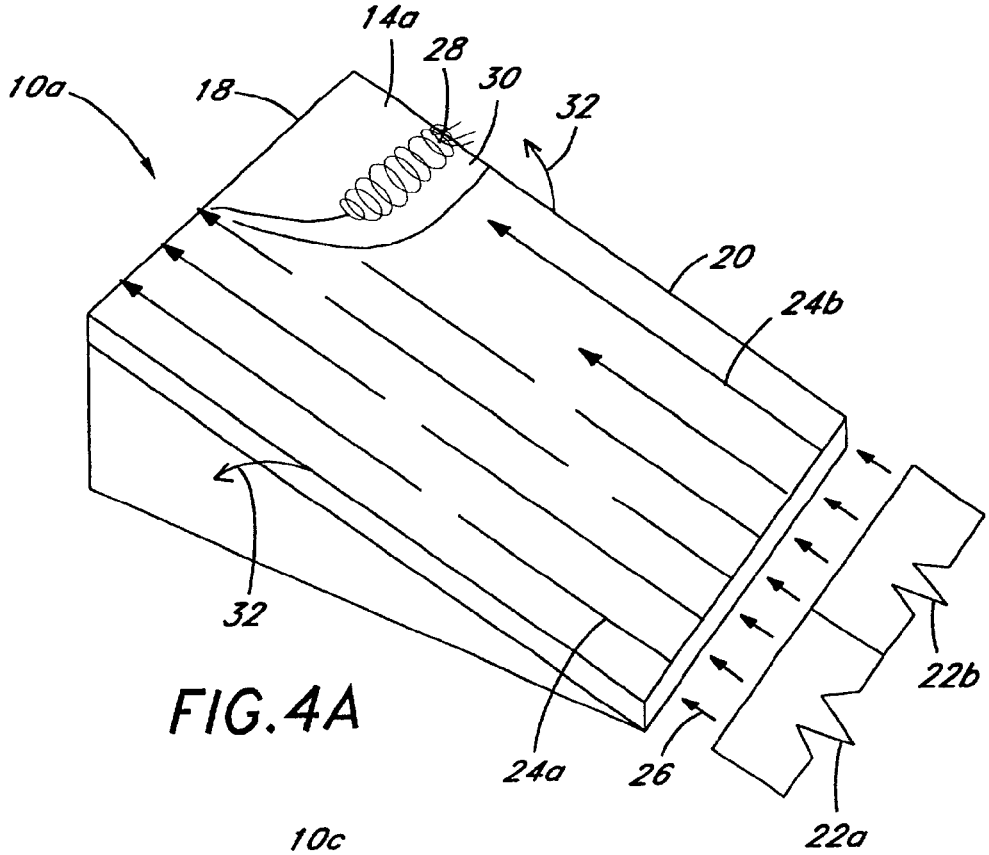
FIG. 4A is a perspective view of the sheet flow water sculpture of FIG. 1A, illustrating a spilling wave formed by a cross-stream velocity gradient.
Figure 4B:
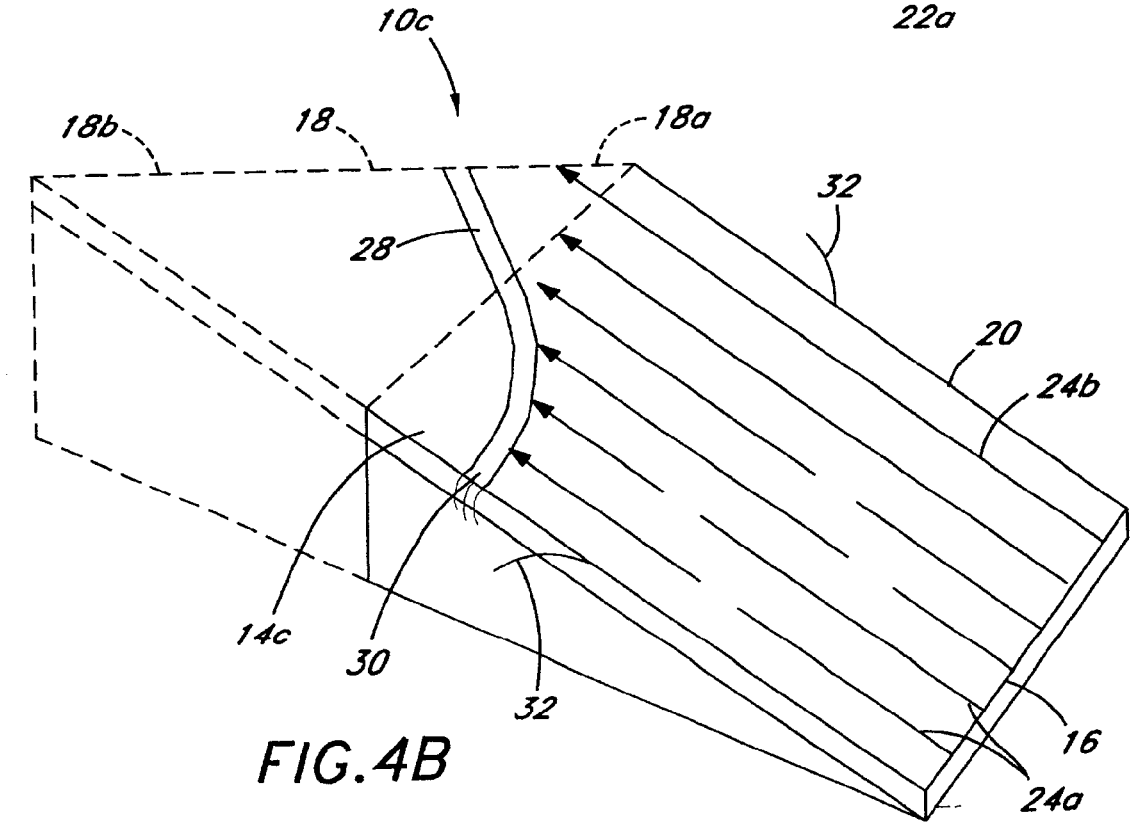
FIG. 4B is a perspective view of a modified sheet flow water sculpture, illustrating a spilling wave formed by a cross-stream pressure gradient.

FIG. 4A depicts one preferred method for producing a simulated spilling wave with a smooth unbroken shoulder. This wave is created by introducing a cross-stream velocity gradient to a supercritical flow of water that moves in direction 26 up the flow surface 14a with a level ridge line 18. The "spilling breaker" effect results from the initial supercritical flow 24a and 24b issuing from respective flow sources 22a and 22b at two distinct velocities and manifesting two subsequent coexisting hydraulic states, i.e., a higher velocity supercritical flow 24a over the top of ridge line 18 (associated with flow source 22a) and an adjacent lower velocity supercritical flow 24b (associated with flow source 22b). The white water 30 that results from this cross-stream velocity gradient is formed by a hydralic jump 28 located below the ridge line 18. Flow surface 14a allows spilling white water 30 to ventilate off the side 20 of the flow surface 14a as run-off water 32, thus avoiding supercritical flow submersion.

The cross-stream velocity gradients as described above were created by placing multiple flow sources of differing kinetic energy side by side and simultaneously projecting them upslope as shown in FIG. 4A. An alternative way of creating cross-stream velocity gradients employs the use of a single source of water with a specially configured nozzle or plenum. For instance, nozzles with asymmetrical apertures can be used to produce the same effect.

As noted above, a second general approach to simulating a spilling wave with a smooth unbroken shoulder is to generate a cross-stream pressure gradient. Such cross-stream pressure gradients can be generated, for example, by sills, depressions, injected water, etc. The preferred technique, in order to avoid penetrations or discontinuity on flow surface 14c, is through increased hydrostatic pressure. In this regard, FIG. 4B shows a water sculpture 10c having a flow surface 14c that is asymmetrically extended (as indicated by dashed lines) to form a downstream ridge line 18 of increasing elevation. Thus, with a proper angle and length of flow surface 14c two subsequent coexisting hydraulic states will result, i.e., the supercritical flow 24a that flows over shortened side 18a of downstream ridge line 18 will clear and sustain its supercritical character, while flow 24b has insufficient kinetic energy to clear extended side 18b of downstream ridge line 18 and will subsequently suffer a hydraulic jump 28 and exhibit white water 30 at a lower elevation on flow surface 14c of water sculpture 10c. The same effect can be achieved and/or enhanced by causing the extended side 18b to be sloped at a greater angle of inclination than the flow surface 14c. Thus, in that case, not only is the extended side 18b longer than the shorter side 18a, it is also at a higher elevation. Water sculpture 10c allows spilling white water 30 to ventilate off the side 20 as run-off water 32, again avoiding supercritical flow submersion.

Example 4

Simulated Tunnel Wave

Figure 5:
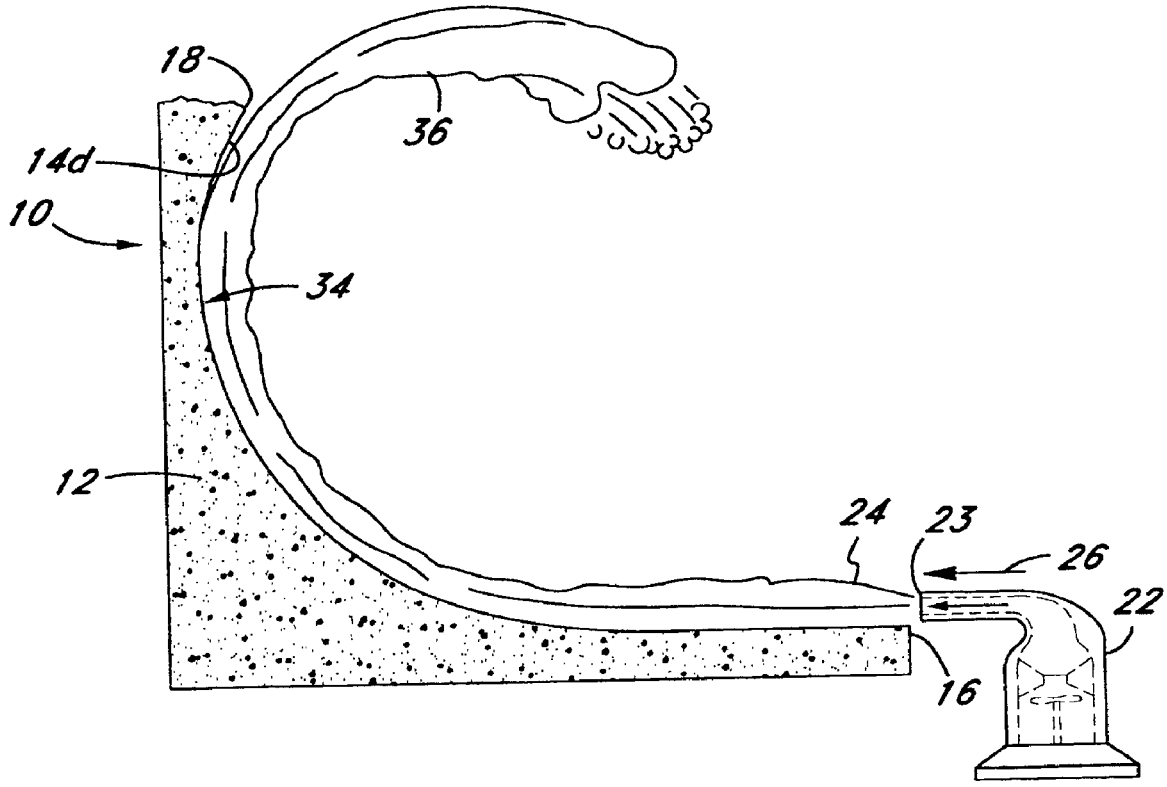
FIG. 5 is a front elevational cross-section view of a tunnel wave water sculpture having features in accordance with the present invention.

One of the most desirable and aesthetically pleasing wave shapes is the tunnel wave. In order to simulate a tunnel wave, a portion of the flow surface is shaped so as to form a generally concave curvature. FIGS. 5 and 6 show two different embodiments of a flow surface particularly adapted to create a tunnel wave. FIG. 5 shows a flow surface with horizontal curvature only (ie. curvature only about a horizontal axis). FIG. 6 shows a flow surface with both horizontal and vertical curvature. These curvatures can be, but do not have to be, circular. Rather, they can be complex, changing curves, such as, an ellipse, parabola, hyperbola, or spiral, as desired.

In FIG. 5, the flow surface 14d exceeds the vertical at transition point 34 and curls back onto itself. The velocity head of the supercritical flow 24 is significantly higher than the highest vertical point of downstream edge or ridge line 18. Supercritical flow 24 moves in a conforming flow upward over the flow surface 14d to form an inclined body of water in the shape of a tunnel wave 36. The slope of flow surface 14d gradually increases from zero to about negative ten degrees in the figure shown. However, the flow surface can also be made to curl substantially beyond the ninety degree transition point 34, such that the flow surface itself forms a substantial portion of a cylinder. Such an embodiment is shown in FIGS. 11 and 12, which will be further described later.

Figure 6A:
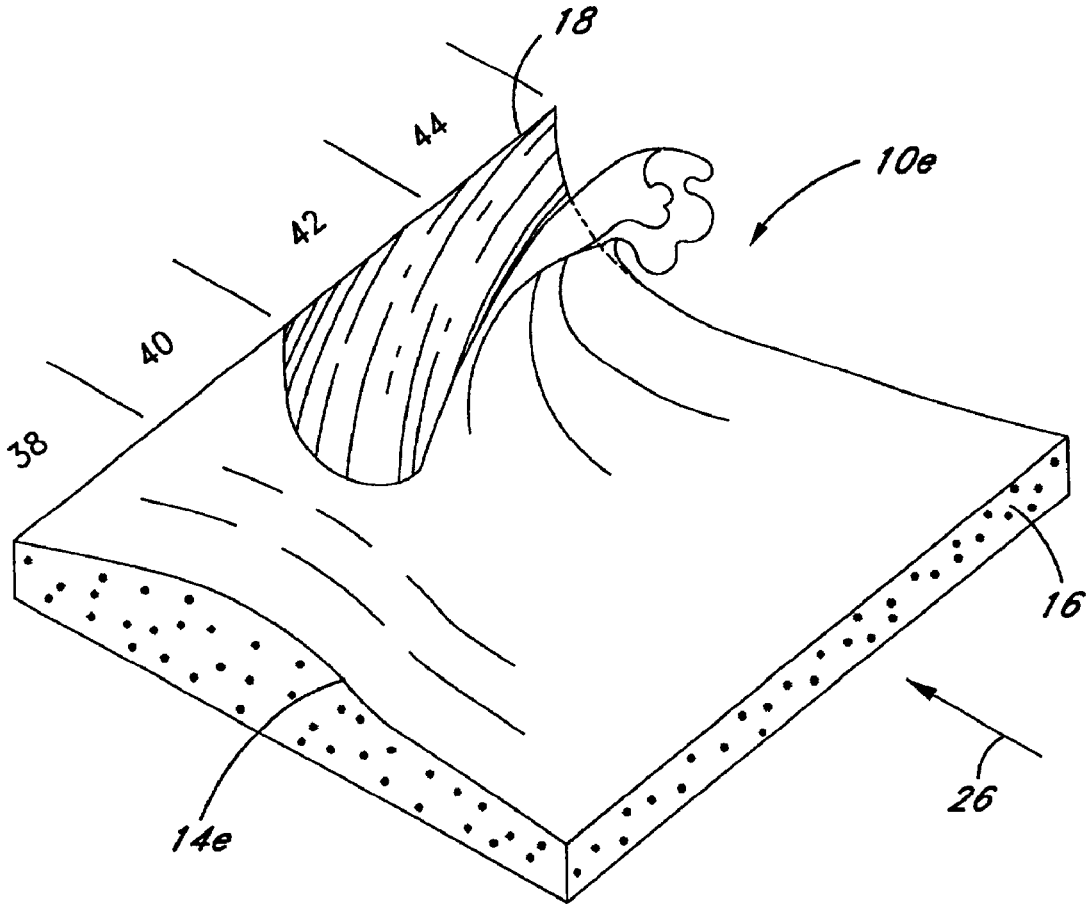
FIG. 6A is a perspective view of an alternative embodiment of a tunnel wave water sculpture having features in accordance with the present invention.
Figure 6B:
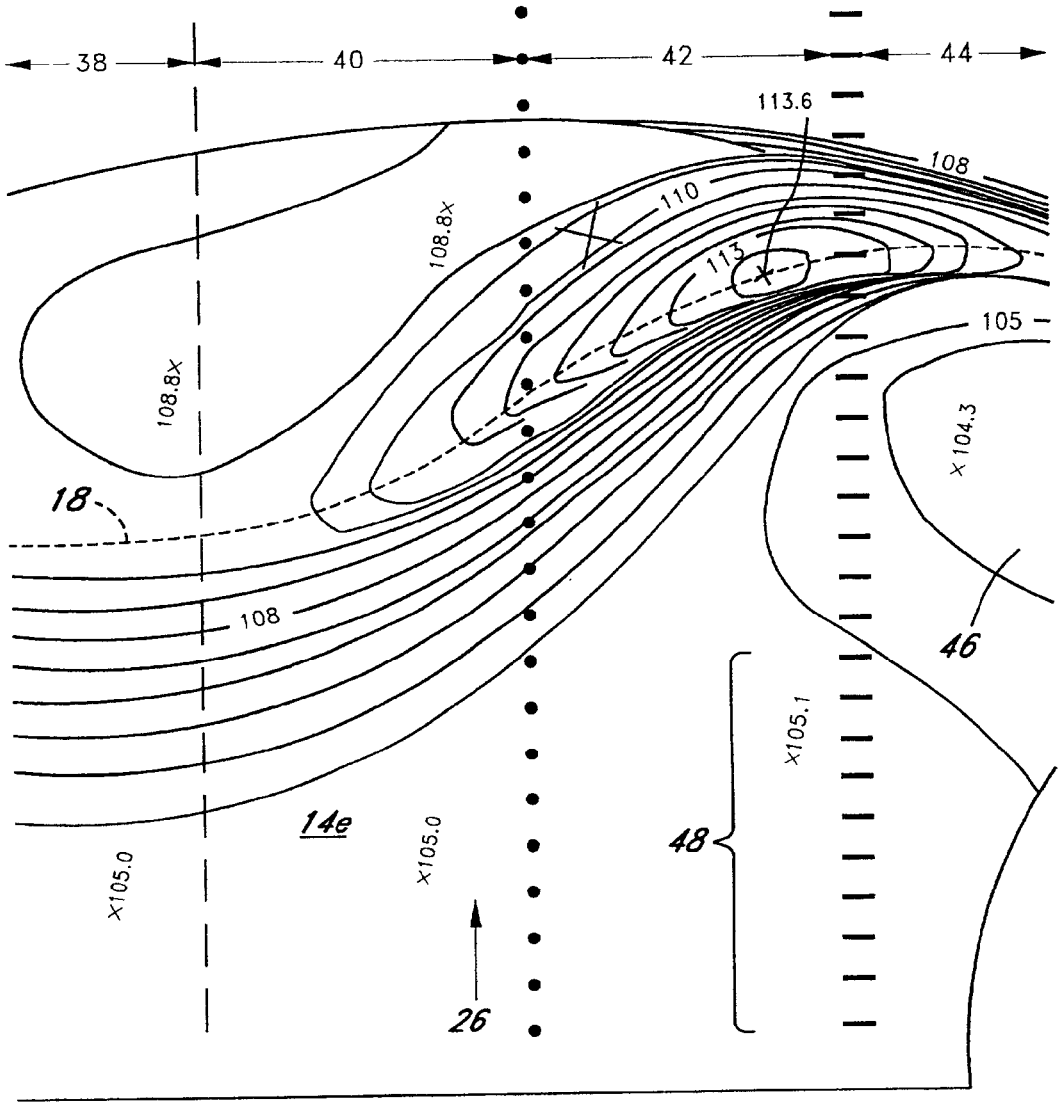
FIG. 6B is a topographical plan view of the tunnel wave water sculpture of FIG. 6A.

FIG. 6 shows a second embodiment of a tunnel wave water sculpture 10e. In addition to producing the desired tunnel wave, the water sculpture 10e can also produce unbroken waves and spilling waves, thereby producing an overall effect of a combination of waves. FIG. 6A shows a basic preferred shape for a flow surface 14e for allowing a supercritically separating flow to form a tube or tunnel that opens onto an unbroken shoulder. A unique characteristic of this basic shape is its ability to enable the separating stream tunnel to form over a wide range of flow velocities and thicknesses and over a flow surface that is not necessarily required to curve past vertical. The basic shape shown in the perspective view of FIG. 6B generally includes a shoulder region 38, an elbow region 40, a pit region 42 and a tail region 44 which, as subsequently described, cooperate to form the tunnel wave as shown.

Referring now to the topographic contour shown in FIG. 6B, preferred elevations and flow regions are identified. Shoulder region 38 is similar in configuration to previously described flow surface shapes for unbroken wave faces (FIGS. 1 and 2). In transitioning to elbow region 40 flow surface 14e begins bending or sweeping in smooth curvilinear fashion in a downstream direction. Concurrent with this downstream sweep, flow surface 14e begins to increase in steepness with downstream ridge line 18 simultaneously increasing in elevation. At its maximum angle of sweep, elbow region 40 transitions to a pit region 42 whereupon flow surface 14e continues to increase to its maximum steepness and concavity and ridge line 18 increases to its maximum elevation. Swale 46 serves to ventilate subcritical spilling white water during start-up, as well as the white water that appears when the lip of the tunnel reconnects. Swale 46 is formed by a smooth sculpted depression in sub-equidyne area 48 of the tail region 44.

Figure 6C:
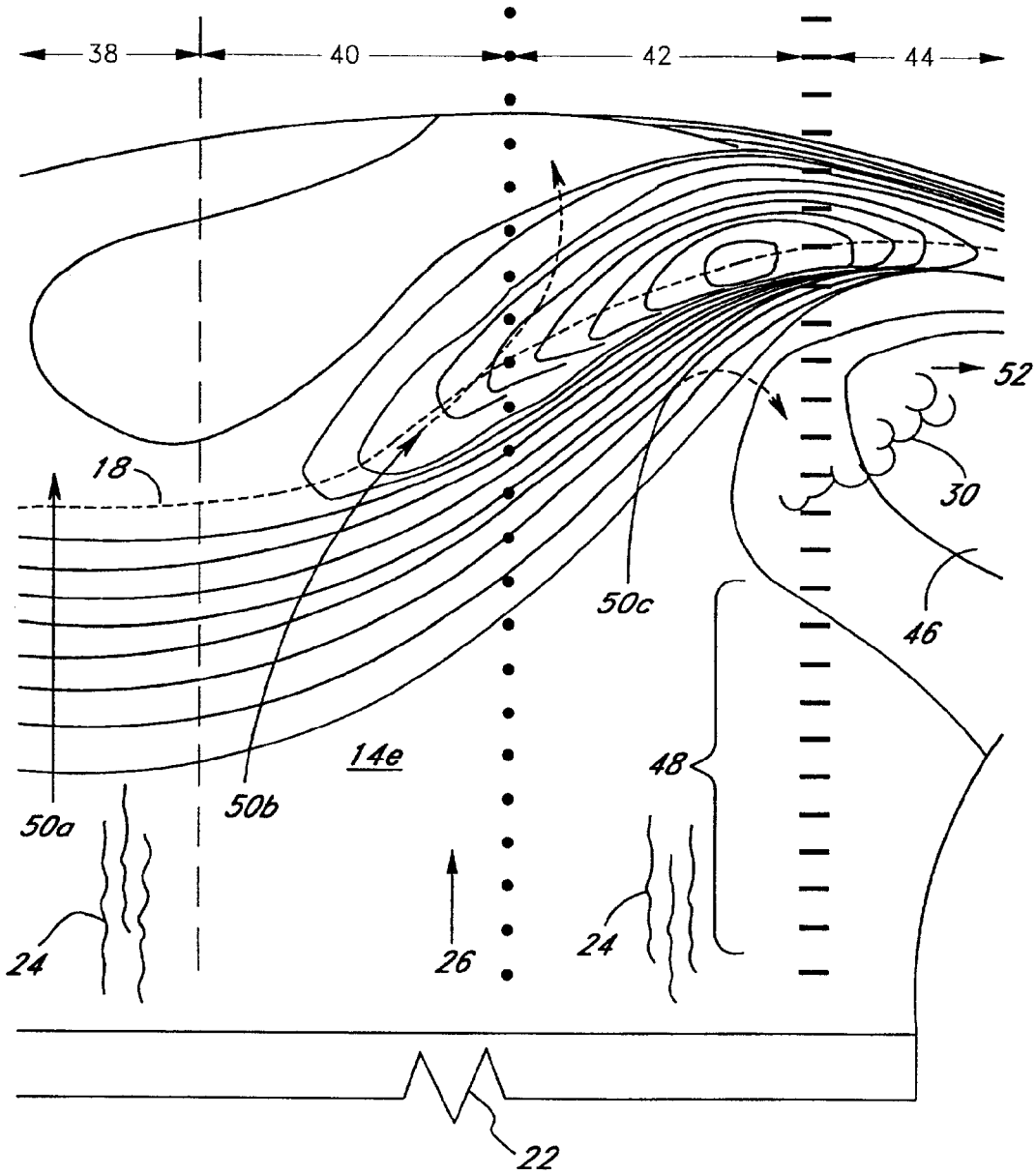
FIG. 6C is a schematic plan view of the tunnel wave water sculpture of FIGS. 6A and 6B illustrating streamline trajectories of water flow upon the flow surface.

FIG. 6C illustrates streamline characteristics of water flow from a suitable flow source 22 (e.g., pump, fast moving stream or elevated dam/reservoir) providing a supercritical sheet flow of water 24 in an initial flow direction 26. The hydraulic characteristics of the flow and its synergistic interaction with the flow surface 14e is best described by reference to each respective sub-region.

In shoulder region 38, the sole source of outside pressure is due to gravity. The uniform rate of surface incline results in flow 24 taking a predominantly two dimensional straight trajectory up flow surface 14e and over downstream ridge line 18 as indicated by a streamline 50a.

In the elbow region 40, a backwards or downstream sweep in the inclined portion of surface 14e creates a low pressure area towards the backswept side. As flow 24 rises in elevation upon elbow region 40, flow 24 begins to turn toward the area of lower pressure as indicated by the solid streamline 50b. Now flow 24 is no longer following a two dimensional streamline. Rather, the streamline path 50b moves in three dimensions due to the cross-stream pressure gradient. The trajectory of flow 24 as indicated by the solid streamline 50b is spirally shaped. If hypothetically extended (indicated by continued dashed line), the last half of this spiral would be directed downslope and conforming to the backswept side of the flow surface 14e.

In pit region 42, the flow 24 again rises in elevation and then turns toward the area of lower pressure as indicated by solid streamline 50c. The trajectory of flow 50c is parabolically inclined and, if hypothetically extended (indicated by continued dashed line), would separate from flow surface 14e and would arc downward until reconnecting in the pit area 44. The swale 46 formed in area 48 combined with an increasing steepness of flow surface 14e results in a parabolic trajectory that moves up straighter and more vertically, as illustrated by streamline 50c. This leads to flow separation resulting in the desired stationary tunnel opening to an unbroken shoulder. As supercritical flow 24 separates from flow surface 14e, its new direction of flow, as indicated by the dashed portion of streamline 50c, is generally transverse to the original direction of flow 26. When streamline 50c reattaches to the flow 26, white water 30 appears and forms a tail race 52 as guided by tail region 44.

A prerequisite to tunnel wave formation is that supercritical flow 24 must have at least sufficient velocity to clear downstream ridge line 18 on shoulder area 38.

Further increases in the velocity of supercritical flow 24 will result in an increase in tunnel diameter, i.e., an increase in apparent wave size.

At least three characteristics of the flow surface influence the overall appearance of the tunnel wave and each of them interacts with the other: (1) its shape; (2) its attitude or horizontal angle with respect to the direction of water flow; and (3) its inclination or vertical angle with respect to the direction of water flow.

The flow surface of the tunnel wave water sculpture 10e of FIGS. 6A–6B preferably has a shape having concave curvature both vertically and horizontally as indicated. The shape of the vertical curvature can be a simple arc or circle or, more preferably, an arc of a more complex changing curve such as an ellipse, parabola, helix, or spiral. If a changing curve is selected, it preferably changes from the opening curve at the leading edge through a transition point to a closing curve at the trailing edge such that the ascending water encounters a decreasing radius as it ascends up the flow surface. At a transition point the flow surface begins to curve past the vertical to about negative 10 to 30 degrees. The shape of the horizontal curvature can be a simple arc or circle, or, more preferably, a portion of a more complex changing curve such as an ellipse, parabola, helix, or spiral.

The horizontal attitude of the flow surface with respect to the direction of water flow can vary within certain limits so as to facilitate the formation of the tunnel wave. Since the front surface of the concave curvature has varying degrees along its horizontal axis for purposes of orientation an extension of upstream edge is used to indicate varying horizontal attitudes of the front face therefrom. Accordingly, upstream edge varies from substantially perpendicular to the direction of water flow to a preferred angle of approximately 35–45 degrees, as shown.

Two additional factors are particularly important with respect to the inclination: (1) the change in angle of incline relative to the depth of water is preferably sufficiently gradual to avoid separation or deflection of streamlines; and (2) the angle of release (the line tangent to the front face of the downstream edge when compared to the vertical) is preferably beyond vertical as shown (although this is not necessary). Amounts of incline beyond vertical may vary, as desired; however, a preferred amount is about 10 degrees.

Figure 7A:
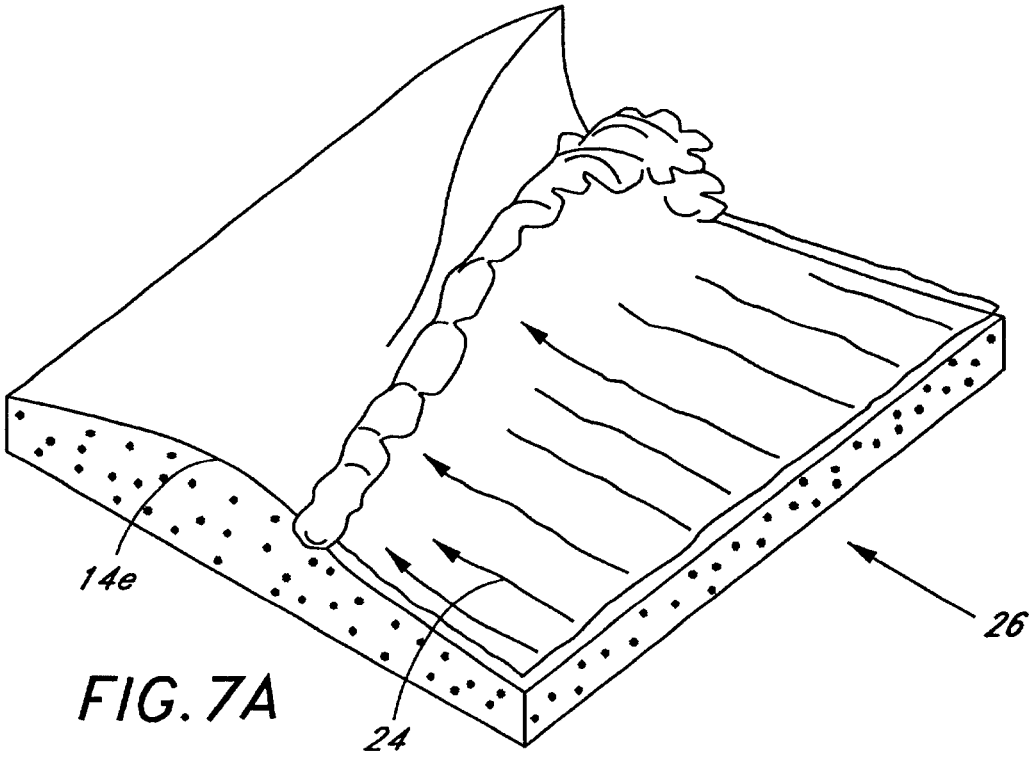
FIGS. 7A, 7B and 7C are schematic perspective views of the tunnel wave water sculpture of FIGS. 6A–C, illustrating three possible modes of operation.
Figure 7B:
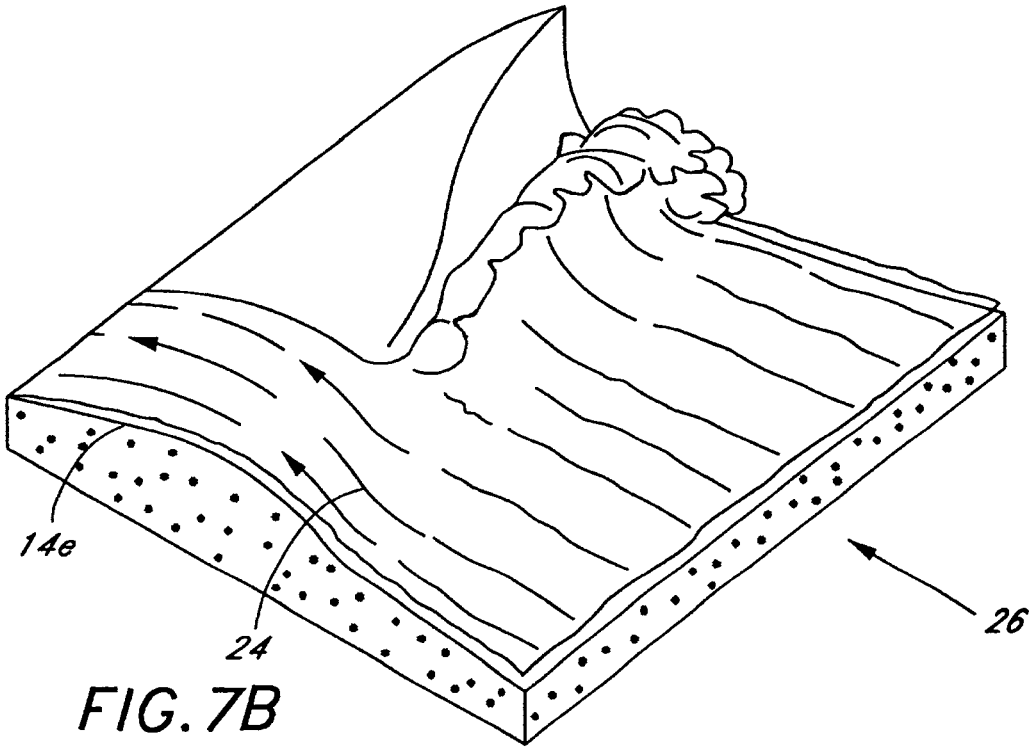
Figure 7C:
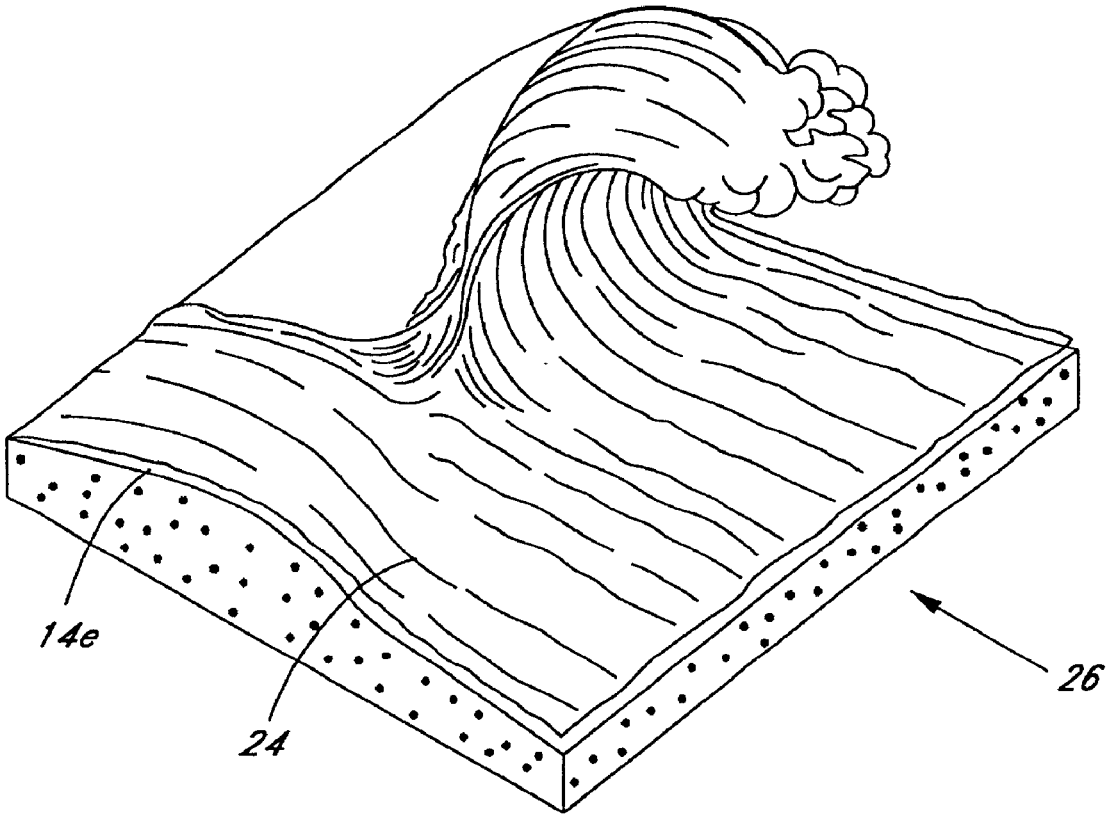

FIGS. 7A, 7B and 7C illustrate yet another unique feature of a flow surface l4e as configured in FIG. 6. In this embodiment, the wave shape can be formed by way of a progressive increase of the velocity of the water flow so as to cause transformation of supercritical water flow 24 that originates from a water source (not shown) in direction 26 to a stationary white water bore along the entire upper ridge of the flow surface (as illustrated in FIG. 7a); to a stationary spilling wave with an unbroken shoulder (as illustrated in FIG. 7b); to a stationary tunnel wave with unbroken shoulder (as illustrated in FIG. 7c). If desired, this progressive water sculpture may be formed using a suitable flow surface to create a dynamic "flow transformation process" culminating in the formation of a tunnel wave.

Example 5

Half-Pipe Flow Configurations

To this point, the sheet flow upon the flow surface has been described as issuing at either an upward incline or horizontally. However, water flowing upon downhill ramps may also have advantages in connection with simulated wave formation. When the source for such flow is from a pump or darn/reservoir with associated aperture, e.g., nozzle, there is significant likelihood that oblique waves (i.e., non-coherent streamlines) will form at an angle to the flow as a result of boundary layer disturbances associated with the aperture enclosure. Oblique waves may grow and lead to choking of an entire flow. The use of downhill ramps can help solve or mitigate this problem by encouraging smooth sheeting flow. Further, downhill ramps add new possibilities for the creation of water scultures with enhanced visual, aural or aesthetic appeal.

Figure 8:
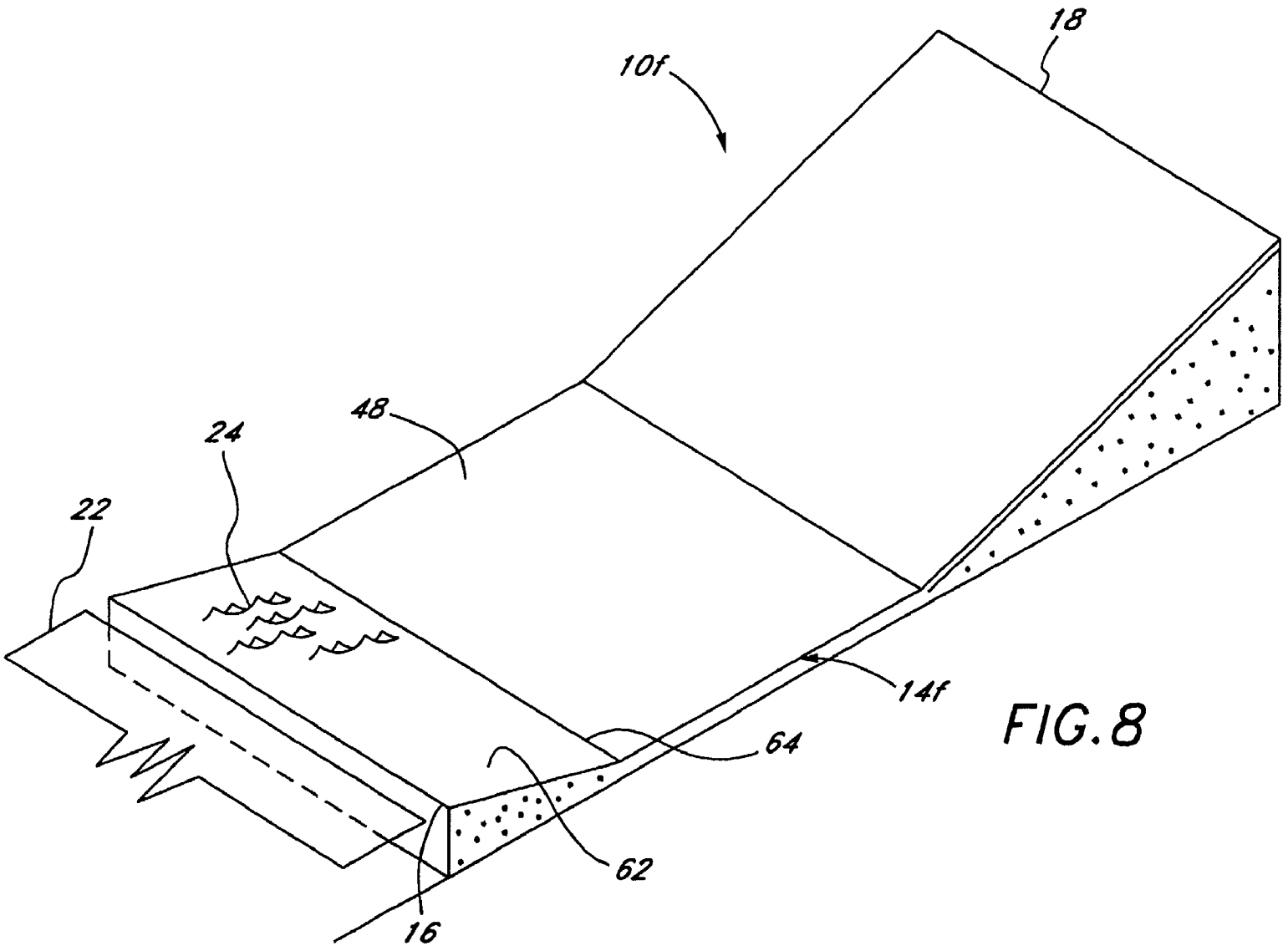
FIG. 8 is a perspective view of a half-pipe water sculpture having features in accordance with the present invention.

FIG. 8 shows a water sculpture 10f having an angular extension of inclined flow surface l4f creating a downhill ramp 62 upon which flow source 22 initially issues supercritical flow 24. This extension or downhill ramp 62 can also be characterized as an extension of the sub-equidyne area of the flow surface l4f and creates a downhill ramp 62 of sufficient decline to inhibit oblique wave formation (i.e., oblique waves are swept downstream). The declined ramp 62 then transitions to an extended intermediate area 48 before ascending up the inclined ramp and over the downstream edge or ridge line 18.

Figure 9:
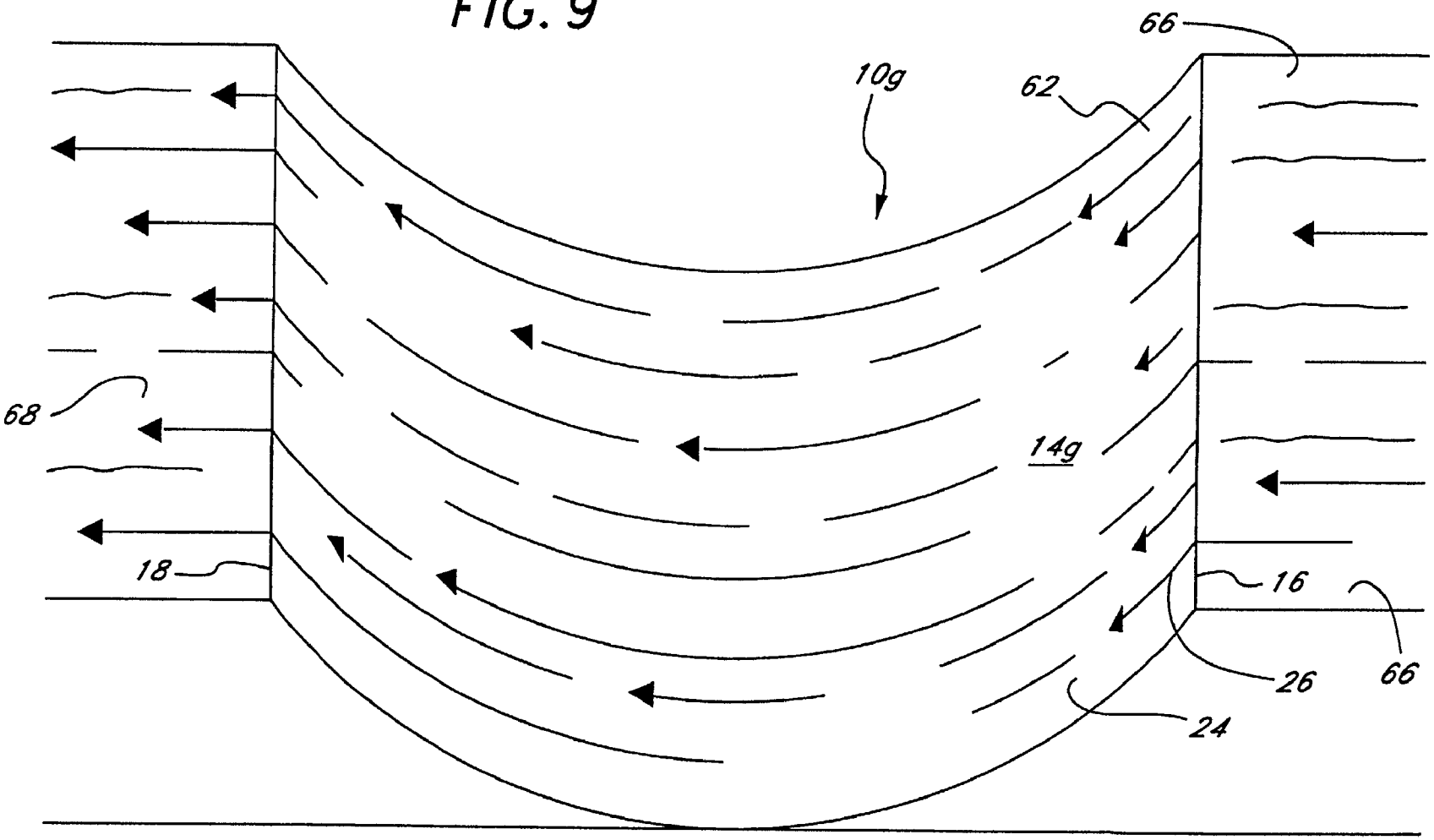
FIG. 9 is a schematic perspective view of an alternative embodiment of a half-pipe water sculpture having features in accordance with the present invention.

The various sections of the flow surface 14f of FIG. 8 need not be so well-defined. Rather, the surfaces can be gradually curved so as to form a continuous curving surface between the upstream edge 16 and the downstream edge 18. In a particularly preferred configuration, these surfaces can form a half-pipe flow surface 14g, as shown in FIG. 9. The half-pipe water sculpture 10g consists of a source pool 66 that supplies a flow of water that turns to a supercritical flow of water 24 shortly after overflowing the upstream edge 16. The water then flows in a direction 26 across the half pipe and over the downstream ridge or edge 18, and into a receiving pool 68. Numerous other configurations involving downhill ramps, horizontal surfaces and inclined surfaces are also possible by varying the curvature and choice of the flow surface 14g.

Example 6

Tunnel Wave Awning

The ability to create stable simulated waves as described above leads to several additional unique possibilities in the field of water sculpture. One particularly exciting possibility is the ability to reproduce the experience of actually being inside a tunnel wave. The sight, sound and sensation of walking through a tunnel wave is a thrilling experience and has heretofore only been available to relatively few people in the world capable of surfing in a naturally occurring tunnel wave or tube. Advantageously, the subject invention allows this prized experience to be enjoyed by virtually anyone who can walk or otherwise traverse down a walkway. The particular examples discussed herein should not be construed as limiting the present invention in any way. Rather, these teachings apply generally to any application which can take advantage of the aesthetic appeal of simulated wave shapes.

Figure 10A:
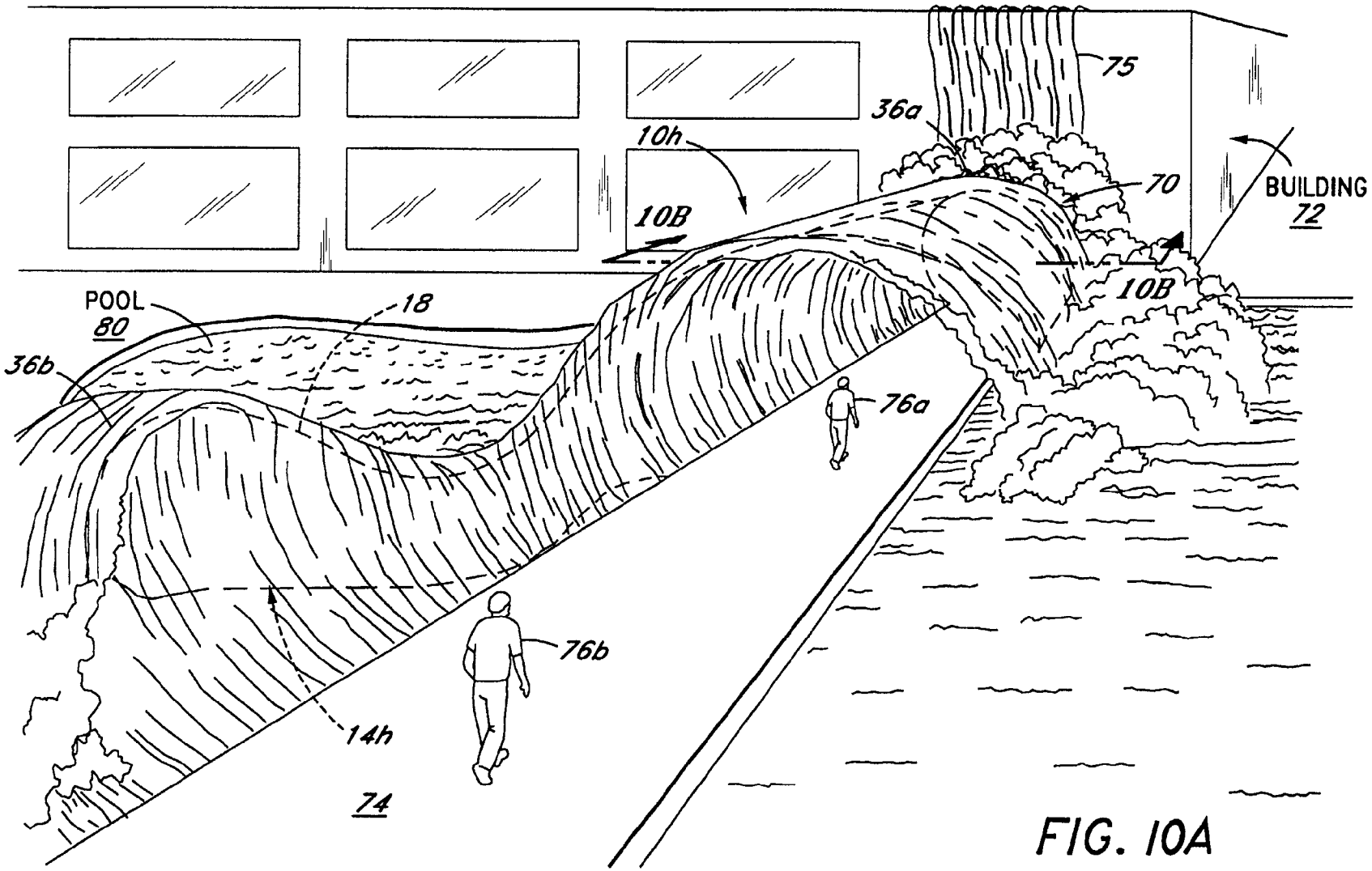
FIG. 10A is a perspective view of a tunnel wave awning water sculpture having features in accordance with the present invention.

FIG. 10A shows a tunnel wave water sculpture 10h forming an entranceway or awning for a building. A giant tunnel wave 36a is formed at the entrance area 70 of a building 72, as shown. A walkway 74 is surrounded by a pool of water 80 and extends through the tunnel wave 36a in order to allow a person 76a to walk through the tunnel wave 36a to enter or exit the building 72. The tunnel wave thereby forms a unique water "awning" for the building. Other wave shapes may also be formed adjacent other portions of the walkway 74, as desired. For instance, to the left of person 76b another tunnel wave 36b is formed that does not extend over the walkway 74. Several other wave shapes could also be formed to surround the walkway and/or the building, thereby enhancing the aesthetic appeal of the overall structure. The water sculpture 10h may be appropriately contoured in accordance with any variety of flow surfaces described above to form a variety of desired wave shapes, such as non-broken waves, white water bores, spilling waves, tunnel waves and/or combination waves. If desired, an optional waterfall 75 or other water effect may be provided between the interface of the tunnel wave and the building 72 in order to mask undesirable dry or exposed areas and/or to create dramatic whitewater effects, expanding or enhancing the visual, aural or aesthetic appeal of the water sculpture 10h and the associated building 72.

Figure 10B:
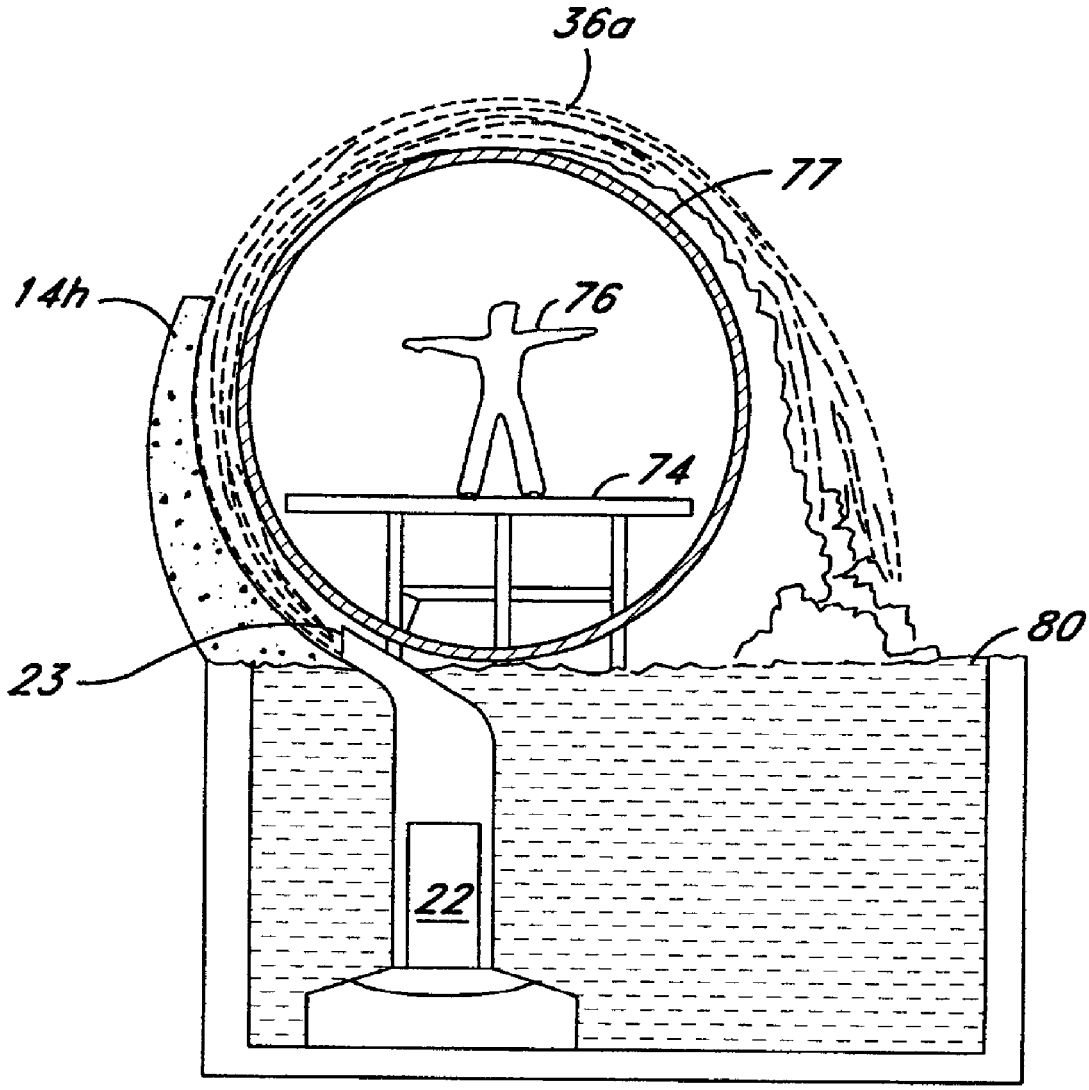
FIG. 10B is a front elevational cross-section view of the tunnel wave awning water sculpture of FIG. 10A.

FIG. 10B shows the tunnel wave awning water sculpture of FIG. 10A in cross-section taken along section lines 10B—10B. One or more flow sources 22 are located underneath the walkway 74 submerged within the pool of water 80. The water from the flow sources 22a–i flows through a nozzle 23 onto an inclined flow surface 14g that is contoured and shaped as shown. The flow surface may or may not curve past vertical at this point, depending the desired effect and the upstream contour of the flow surface 14h. Water forming the tunnel wave 36a flows over the walkway, as shown, and returns to the pool of water 80 where flow source 22 is located. Therefore, water recycling is advantageously employed. If desired, an optional shield 77 may be provided inside the free falling tunnel wave 36a and extending outward from the building entranceway 70 to protect persons 76a,b on the walkway 74 from getting wet.

Theoretically, no pool or water reservoir is required for the water sculpture since a flow from a suitable flow source is all that is required. However, where water recycling is preferred, low channel walls can be constructed to retain the flowing water with a lower collection pool recycling pump and appropriate conduit connected back to the upstream flow source. The area of channel containment need only be large enough to form the tunnel wave since most of the returning water of the tunnel wave will remain more or less stationary within the containment structure. Thus, such a structure can be constructed even in a limited amount of space.

Figure 10C:
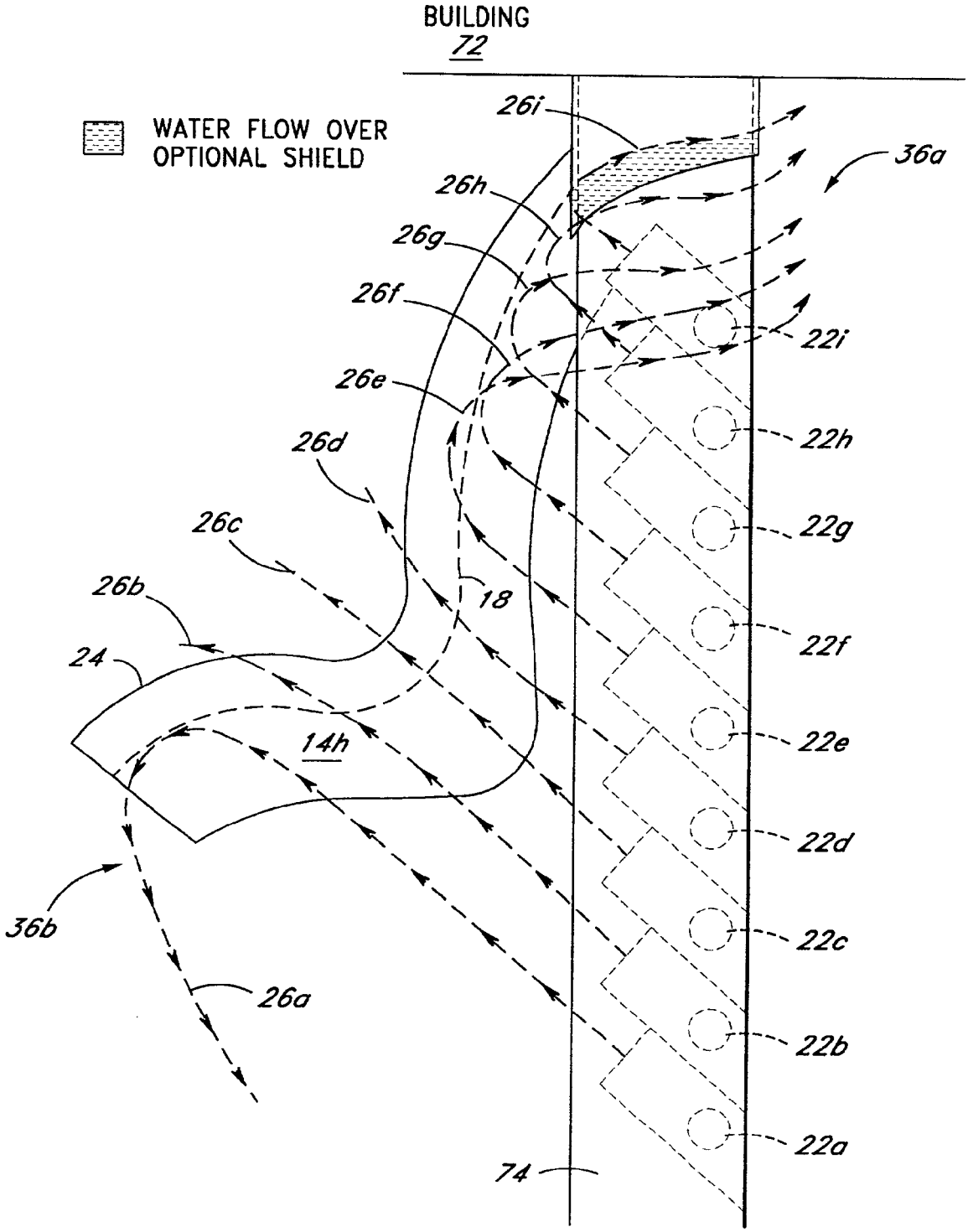
FIG. 10C is a schematic plan view of the tunnel wave awning water sculpture of FIGS. 10A–B, illustrating streamline trajectories of water flow upon the flow surface.

FIG. 10C shows a schematic plan view of the tunnel wave awning water sculpture of FIGS. 10A–B, illustrating a preferred flow profile of flow supporting surface 14h. As shown, a plurality of serially arranged flow sources 22a–i provide a sheet flow of water over the flow supporting surface 14h as indicated by streamlines 26a–i. The initial flow of water from the flow sources 22a–i need not be completely horizontal to the ground nor perpendicular to flow surface 14h. Rather, the angle of incidence with the flow surface 14h may vary in several directions, as desired, in order to create waves of various shapes and sizes. The angle of incidence of the sheet flow 26a–i in the horizontal plane preferable ranges from about −45 degrees to about +45 degrees with respect to normal, as shown.

In the particular embodiment shown, two tunnel waves 36a, 36b are formed, the main tunnel wave being formed by the streamlines 26e–26i and the secondary tunnel wave being formed by the streamlines 26a–c. Starting from the lowermost flow source 22a, water under pressure is forced out of a nozzle or other flow forming aperture onto the flow supporting surface 14h. The flow supporting surface 14h is angled and inclined such that the streamline 26a rises up the incline and is then bent back upon itself forming a free falling tunnel wave 36b, as shown. Flow sources 22b–22d inject corresponding water flows 26b–26d, which impact generally at the apex or "V" section of the flow supporting surface 14h. The velocity of the water flow at this point is preferably sufficient to overcome the potential energy at the uppermost ridge 18 of the flow surface at that point. Referring to FIG. 10A, it can be seen that the ridge line 18 of the flow surface 14h at the "V" point is relatively low so that the water easily flows over the flow surface 14g at that point.

Beginning with flow sources 22e, a flow 26e is projected upward onto the flow surface 14h and is directed upward and to the right, such that the flow separates forming a dramatic tunnel wave 36a, as illustrated in FIG. 10A. The remaining streamlines 26f–26i also follow the same general path progressively flowing upward along the flow supporting surface 14h and being directed across the walkway, as shown, to form a tunnel wave 36a. The radius of vertical curvature (ie. curvature about a vertical axis) of the flow supporting surface 14h preferably decreases or gets tighter progressively toward the downstream end of the flow surface 14h. This allows each of the streamlines 26e–26i to assume a generally converging funnel-type tunnel wave shape so as to provide a unique and inviting appearance. Alternatively, a constant horizontal or vertical curvature may also be employed or changing curvatures may be used, as desired, to form any number of desired symmetric or asymmetric wave shapes.

FIGS. 11A and 11B show an alternative embodiment of a tunnel wave awning water sculpture 10i similar to that shown and described above in connection with FIGS. 10A–C. In this embodiment, however, the flow surface 14i has a simple horizontal concave curvature, curling past vertical back onto itself to form a partial cylinder. This embodiment may be particularly desirable in applications in which a highly uniform tunnel wave 36 is desired or where space constraints might otherwise prohibit the use of a more complex curving flow supporting surface such as shown in FIGS. 10A–C.

Figure 12A:
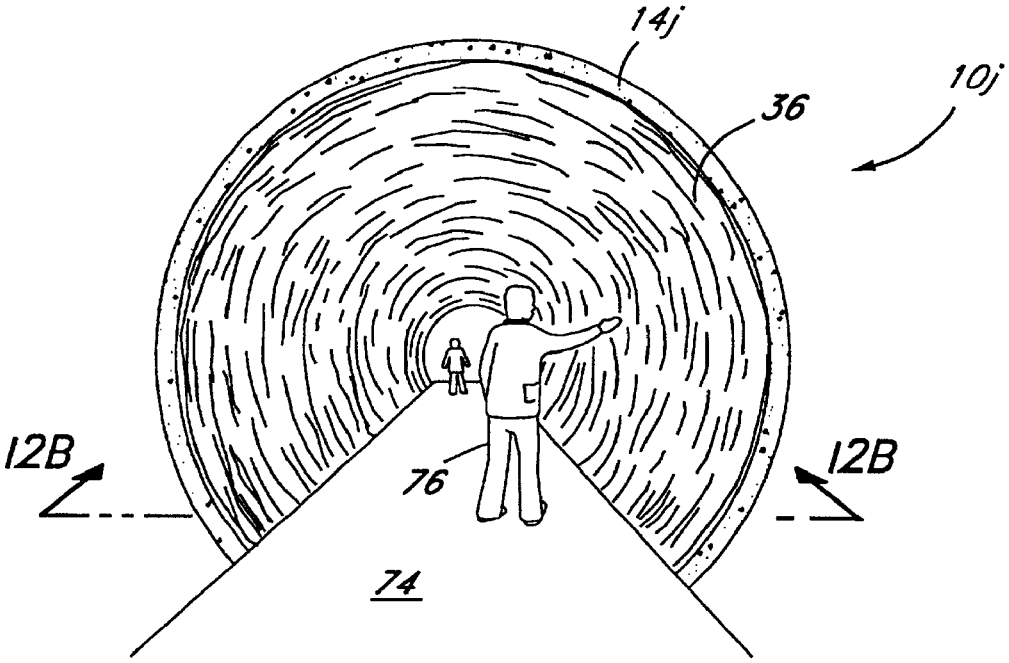
FIGS. 12A and 12B are perspective and front elevational cross-section views, respectively, of a second alternative embodiment of a tunnel wave awning water sculpture having features in accordance with the present invention.
Figure 12B:
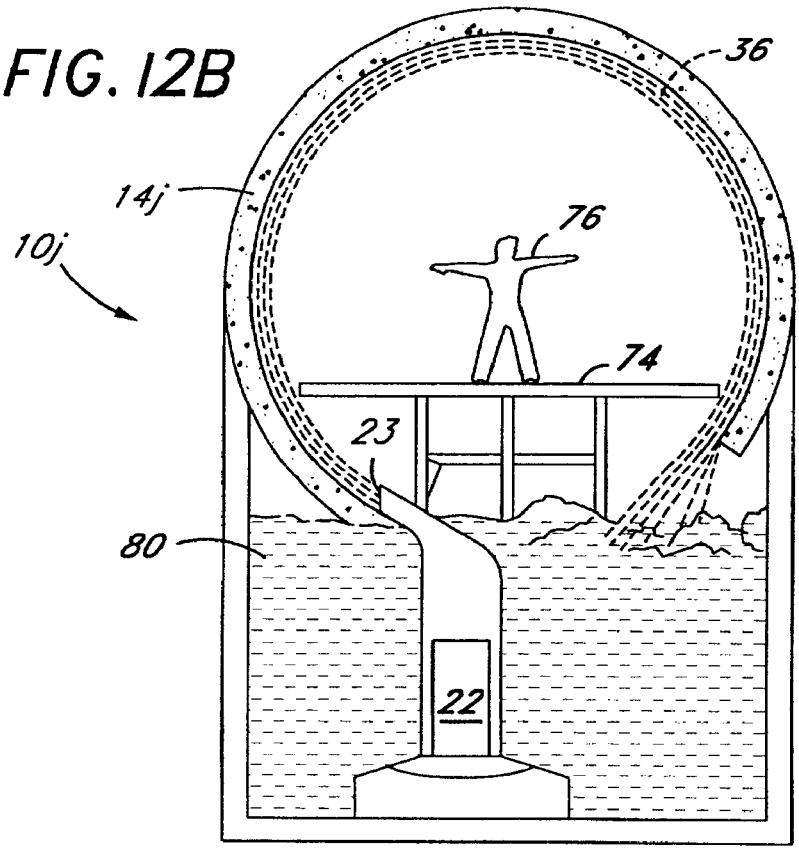
Figure 13A:
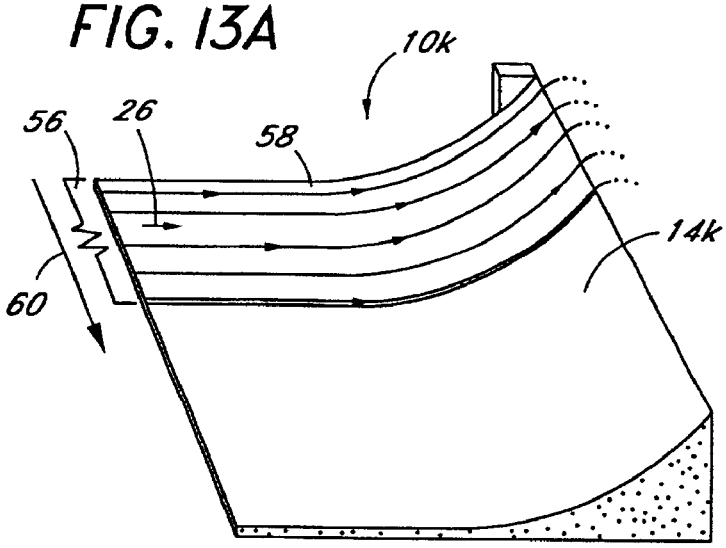
FIGS. 13A–C are time-sequenced perspective views of a dynamic water sculpture having features in accordance with present invention.
Figure 13B:
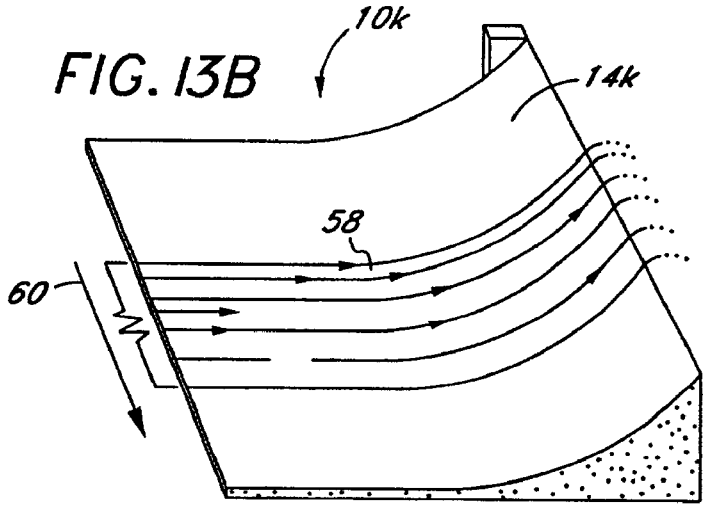
Figure 13C:
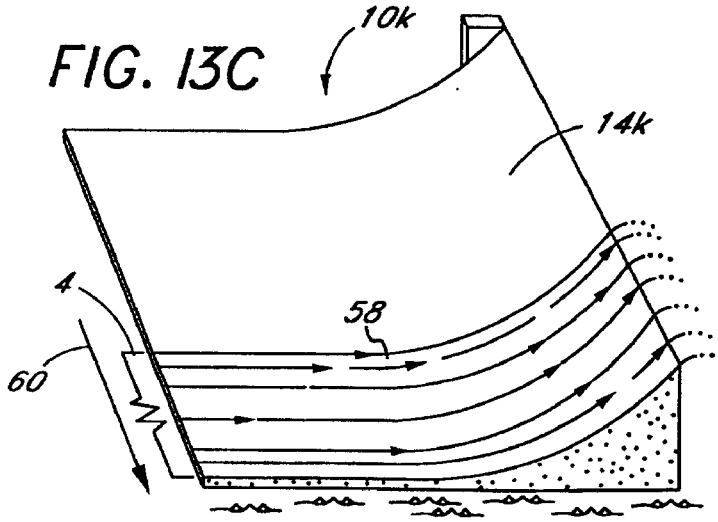

FIGS. 12A and 12B show a further alternative embodiment of a tunnel wave awning water sculpture 10j wherein the flow supporting surface 14j extends substantially completely around the walkway 74 in order to form an enclosed cylindrical tunnel wave 36. This embodiment is referred to as an "enclosed tunnel wave awning" because conforming water flow is caused to flow nearly 360° around the cylindrical flow supporting surface 14j. To achieve this effect, the velocity of the water flow should be at least sufficient to maintain conforming water flow along the inner surface of the flow supporting surface 14i.

Example 7

Dynamic Water Sculpture

Another desirable option for a water sculpture is to provide a dynamic component or effect such as a moving water swath 58, as shown in the time-sequenced depictions in FIGS. 15A–C. Moving water swath 58 has a sideways component or direction of travel (as indicated by arrow 60), in addition to the previously described direction of flow 26. Sideways component of motion 60 preferably moves at the rate of 1 to 5 meters per second. A moving aperture 56 can be formed from either a moving nozzle, moving weir, or sequentially opening an array of apertures (not shown). A variety of simulated wave forms can be readily acccomplished by modifying the surface inclination of flow surface 14k and/or the direction and velocity of water flow as previously described so as to form, for example, a simulated moving tunnel wave. The moving water swath 58 can also be caused to flow on any one of a number of other flow supporting surfaces, such as (by way of example only) those shown and described in connection with FIGS. 10–12, above.

It should be understood that the preferred embodiments and examples shown and described herein are merely exemplary applications of a wave-shaped water sculpture having desirable features of the present invention. The scope of the present invention should not be construed as limited to any specific embodiment described herein. Rather, the invention may be embodied in a wide variety of other forms without departing from the spirit or essential characteristics as disclosed herein. Accordingly, it is intended that the scope of the present invention should be determined only by reference to the claims that follow.

What is claimed is:

1. A water sculpture comprising:

a flow surface adjacent a platform or walkway with at least a portion thereof having a generally inclined slope;

at least one source of water for providing a sheet flow of water onto said flow surface such that said sheet flow of water flows upwardly onto said inclined slope and substantially conforms to said flow surface, *said sheet flow of water having a depth of at least about 1 cm*; and said flow surface having a shape adapted to simulate a desired wave form wherein at least a portion of said flow of water assumes an airborne trajectory over said walkway to form a tunnel-like passageway.

2. The water sculpture of claim 1, wherein said flow surface has a shape adapted to simulate an undulating unbroken wave.

3. The water sculpture of claim 1, wherein said flow surface has a shape adapted to simulate a white water bore.

4. The water sculpture of claim 1, wherein said flow surface has a shape adapted to simulate a spilling wave.

5. The water sculpture of claim 1, wherein said flow surface has a shape adapted to simulate a tunnel wave.

6. The water sculpture of claim 5, wherein said tunnel wave forms an awning of a building.

7. The water sculpture of claim 1, wherein said flow surface is adapted to produce a plurality of simulated wave forms.

8. The water sculpture of claim 1, wherein said flow of water is supercritical over at least a portion of said flow surface.

[9. The water sculpture of claim 1, wherein said flow of water has a depth of at least about 1 cm.]

10. The water sculpture of claim 1, wherein said inclined slope is curved.

11. The water sculpture of claim 1, wherein said flow surface has at least a portion thereof having a generally downwardly inclined slope.

12. The water sculpture of claim 11, wherein said downwardly inclined slope and said inclined slope together form a curved half-pipe.

13. The water sculpture of claim 1, wherein said airborne trajectory is partially or fully directed by an outer enclosure or housing formed around said platform or walkway.

14. An apparatus for forming a water sculpture, comprising:

a flow surface with at least a portion thereof having a generally inclined slope;

a platform or walkway adjacent said flow surface;

at least one flow source for providing a sheet flow of water onto said flow surface such that said sheet flow of water flows upwardly onto said inclined slope and substantially conforms to the contours thereof *and said flow of water on said flow surface has a relationship, characterized in terms of the Froude number, in a range of about 4 to 25*; and said flow surface further comprising an upwardly rising section sized and configured so as to induce separation of said sheet flow, whereby at least a portion of said sheet flow of water assumes an airborne trajectory over said platform or walkway producing visual, aural and/or aesthetic appeal.

15. The apparatus of claim 14, wherein said flow surface is supported by a concrete structure.

16. The apparatus of claim 14, wherein said flow surface has an upward concavity along a longitudinal cross section generally parallel to the direction of said flow.

17. The apparatus of claim 14, wherein said flow surface comprises a longitudinal cross section having an upward concavity transitioning to an upward convexity.

18. The apparatus of claim 14, wherein said flow surface comprises a combination of straight, concave and convex surfaces relative to the direction of said water flow.

[19. The apparatus of claim 14, wherein said flow of water on said flow surface has a relationship, characterized in terms of the Froude number, in a range of about 4 to 25.]

20. The apparatus of claim 14, wherein said upwardly rising section comprises a wave forming structure obliquely positioned vertically and horizontally with respect to the direction of said flow of water on said flow surface, wherein said flow of water is directed upon said wave forming structure to create a spilling wave.

21. The apparatus of claim 14, wherein at least a portion of said flow of water has a velocity less than that needed to ascend over the top of said inclined slope of said flow surface, whereby a hydraulic jump is formed.

22. The apparatus of claim 14, wherein the kinetic energy of said flow of water is less than the potential energy of said flow at the top of said inclined slope of said flow surface.

23. The apparatus of claim 14, wherein the top of said inclined slope of said flow surface forms a ridge line.

24. The apparatus of claim 23, wherein a portion of said flow of water is provided at a higher velocity than another portion of said flow of water, wherein a cross-stream velocity gradient is formed, wherein said flow of water moving at said higher velocity flows over said ridge line, and wherein said flow of water moving at said lower velocity forms a hydraulic jump below said ridge line.

25. The apparatus of claim 24, wherein said ridge line has an increasing elevation from one side of said flow surface to another.

26. The apparatus of claim 14, wherein said inclined slope curls back past vertical whereby said flow of water on said inclined slope forms a tunnel wave.

27. A water awning comprising a tunnel wave water sculpture forming a sheet flow of water having an airborne trajectory over an adjacent walkway or entranceway to form a tunnel-like passageway.

28. The water awning of claim 27, wherein said water sculpture comprises a substantially cylindrical flow surface.

29. The water awning of claim 27, wherein said airborne trajectory is partially or fully directed by an outer enclosure or housing formed around said walkway or entranceway.

30. A walk-through water sculpture comprising:

a platform or walkway for allowing pedestrians or vehicles to traverse a predetermined distance;

a flow surface disposed adjacent said platform or walkway and having at least a portion thereof comprising a generally inclined slope;

at least one flow source for providing a flow of water onto said flow surface such that said flow of water flows upwardly onto said inclined slope substantially conforming to the contours thereof; and said flow surface farther comprising an upwardly rising section sized and configured so as to induce separation of said flow of water on said upwardly rising section and thereby causing at least a portion of said flow of water to assume an airborne trajectory over said walkway.

31. The sculpture of claim 30, wherein said flow of water assumes an airborn trajectory simulating a tunnel wave.

32. The sculpture of claim 30, wherein said airborne trajectory is partially or fully directed by an outer enclosure or housing formed around said platform or walkway.

33. A water sculpture, comprising:

an inclined flow surface adjacent a platform or walkway;

one or more flow sources for providing a flow of water onto said flow surface, said flow conforming substantially to said flow surface; and said flow surface further comprising a upwardly rising section sized and configured so as to induce separation of said flow of water on said upwardly rising section, whereby at least a portion of said flow of water assumes a trajectory that simulates a naturally occurring wave form projecting over said adjacent platform or walkway to form a tunnel-like passageway.

34. The water sculpture of claim 33, wherein said upward rising section comprises a tunnel wave generator for creating a desired tunnel wave flow shape.

35. The water sculpture of claim 33, herein at least two separate and independent flows are provided on said flow surface, each of said flows creating a desired flow shape or wave shape.

36. The water sculpture of claim 33, wherein the velocity of said flow is sufficient to cause said flow to ascend upward onto said flow surface and said upward rising section thereof, wherein by the force of gravity said flow is caused to return substantially upon itself in a downward arc to [Ax] *form* a curling or spilling wave.

37. The water sculpture of claim 33, wherein said flow surface is contoured and has a concave-up or semi-cylindrical curvatur.

38. The water sculpture of claim 33, herein said flow of water has a relatively uniform thickness.

39. The water sculpture of claim 33, wherein said trajectory is partially or fully directed by an outer enclosure or housing formed around said platform or walkway.

[40. A water sculpture comprising:

a flow surface with at least a portion thereof having a generally inclined slope;

at least one source of water for providing a sheet flow of water onto said flow surface such that said sheet flow of water flows upwardly onto said inclined slope and substantially conforms to said flow surface;

said flow surface having a shape adapted to simulate a tunnel wave; and a platform or walkway extending through said tunnel wave wherein said tunnel wave forms an awning over said platform or walkway.]

[41. A water awning comprising a tunnel wave water sculpture having a substantially cylindrical flow surface for forming a sheet flow of water over a walkway or entranceway.]

*42. A walk-through water sculpture comprising:*

*a reservoir of water;*

*a flow surface with at least a portion thereof having a generally upwardly inclined slope;*

*a platform or walkway adjacent said flow surface;*

*at least one water injector for providing a flow of water from said reservoir onto said flow surface along a flow path such that said flow of water flows upwardly onto said inclined slope and substantially conforms to said flow surface;*

*said flow surface having a shape adapted so that said flow of water curls over said platform or walkway and then flows off of said flow surface and splashes into said reservoir after a single pass over said flow surface, simulating a desired wave form.*

*43. The water sculpture of claim 42, wherein said water injector comprises a pump.*

*44. The water sculpture of claim 43, wherein said pump communicates with said reservoir.*

*45. The water sculpture of claim 44, wherein said flow path runs from said pump across said flow surface and to said reservoir.*

*46. The water sculpture of claim 44, wherein said platform or walkway is positioned in or above said reservoir.*

*47. The water sculpture of claim 42, wherein said flow path leads from said flow surface to said reservoir.*

*48. The water sculpture of claim 42, wherein said flow surface has a generally tubular shape adapted to simulate a tunnel wave.*

*49. The water sculpture of claim 48, wherein said flow surface comprises a substantially horizontal portion and a downwardly inclined portion, and said substantially horizontal portion is disposed above said walkway and said downwardly inclined portion is disposed adjacent said walkway on a side of said walkway opposite said upwardly inclined portion.*

*50. A water sculpture, comprising:*

*a reservoir for retaining water;*

*a flow surface with at least a portion thereof having a generally inclined slope;*

*a platform or walkway adjacent said flow surface; and*

*at least one pump for providing a flow of water from said reservoir onto said flow surface;*

*said pump and flow surface adapted so that said flow of water flows upwardly onto said inclined slope substantially conforming to said flow surface and flowing over said platform or walkway and then back into the reservoir;*

*said flow surface and said reservoir being configured so that substantially all of said flow of water is directed from said flow surface to said reservoir after a single pass over the flow surface.*

*51. The water sculpture of claim 50, wherein said platform or walkway is positioned directly above said reservoir.*

*52. The water sculpture of claim 50, wherein said reservoir is adapted to retain water in a substantially static state relative to said flow of water.*

*53. The water sculpture of claim 50, wherein said flow surface has a shape adapted to simulate a white water bore.*

*54. The water sculpture of claim 50, wherein said flow surface has a shape adapted to simulate a spilling wave.*

*55. The water sculpture of claim 50, wherein said flow surface has a shape adapted to simulate a tunnel wave.*

*56. The water sculpture of claim 55, wherein said platform or walkway extends through said tunnel wave.*

*57. The water sculpture of claim 55, wherein said tunnel wave forms an awning of a building.*

*58. The water sculpture of claim 50, wherein said flow of water is supercritical over at least a portion of said flow surface.*

*59. The water sculpture of claim 50, wherein said flow surface has at least a portion thereof having a generally downwardly inclined slope.*

*60. The water sculpture of claim 59, wherein said downwardly inclined slope directs said sheet flow of water into said reservoir.*

*61. A method for creating a walk-through water sculpture, comprising the steps of:*

*providing a flow surface having a substantially concave inclined portion;*

*providing a walkway or platform adjacent the flow surface;*

*providing a reservoir of water generally below the walkway or platform; and*

*directing a flow of water from the reservoir onto the flow surface so that substantially the entire flow of water substantially conforms to the flow surface and curls over the walkway or platform and into the reservoir.*

*62. The method of claim 61, additionally comprising the step of forming the flow of water into a sheet flow.*

*63. The method of claim 62, additionally comprising the step of imparting sufficient kinetic energy to the flow of water so that the flow of water is supercritical over at least a portion of the flow surface.*

*64. The method of claim 61, wherein the flow surface is substantially tubular.*

*65. The method of claim 61, additionally comprising the step of providing a pump communicating with the reservoir, said pump adapted to provide the flow of water.*

*66. The method of claim 61, wherein the platform or walkway is disposed in or above the reservoir.*

*67. A tunnel wave water sculpture comprising:*

*a reservoir for retaining water;*

*a platform or walkway disposed above the reservoir;*

*a flow surface having a generally cylindrical portion extending generally around the platform or walkway, the flow surface not forming a complete cylinder; and*

*at least one water injector for directing a flow of water onto the flow surface at a location generally adjacent a first side of the walkway in a manner so that the water flows along the flow surface over the walkway and flows into the reservoir at a location generally adjacent a second side of the walkway.*

*68. The tunnel wave water sculpture of claim 67, wherein the platform or walkway is supported by support members extending upwardly from the reservoir.*

*69. The tunnel wave water sculpture of claim 67, wherein water from the water injector flows once across the flow surface before splashing into the reservoir.*

*70. The tunnel wave water sculpture of claim 69, wherein water in the reservoir is directed into the water injector.*

*71. A tunnel wave water sculpture comprising:*

*a substantially arcuate flow surface having an entry portion and an exit portion:*

*a platform disposed beneath at least a portion of the arcuate flow surface so that the flow surface entry portion is disposed generally adjacent a first side of the platform and the flow surface exit portion is disposed generally adjacent a second side of the platform;*

*a water receiving basin generally below the platform;*

*at least one water injector for directing a flow of water onto the entry portion in a manner so that water flows along the flow surface over the platform to the exit portion, from which substantially the entire flow of water exits the flow surface and flows into the water receiving basin.*

*72. The tunnel wave water sculpture of claim 71, wherein water from the water receiving basin is directed back to the water injector so as to be again directed over the flow surface.*

*73. The tunnel wave water sculpture of claim 71, wherein the platform is supported by support members disposed in the water receiving basin.*

*74. An apparatus for forming a tunnel wave through which people can pass, said apparatus comprising a flow surface, a platform or walkway and at least one nozzle for directing water onto the flow surface,*

*the flow surface having a concave curvature curling past the vertical back onto itself to form a partial cylinder having a longitudinal axis,*

*the platform or walkway extending through the partial cylinder and generally parallel to said axis.*

*75. An apparatus as claimed in claim 74, wherein the platform or walkway has opposing edges, each opposing edge spaced from the flow surface of said partial cylinder and wherein the partial cylinder provides a first opening adjacent the platform or walkway and serving as an inlet for water directed on said flow surface and a second opening adjacent the platform or walkway and serving as an outlet for water on said flow surface.*

*76. An apparatus as claimed in claim 74, wherein said partial cylinder comprises an opening disposed adjacent either side of the platform or walkway and wherein the walkway comprises supports extending through said opening.*

*77. An apparatus as claimed in claim 74, further comprising a water reservoir below the walkway, so that water can be drawn from the reservoir and directed through the nozzle(s) onto the flow surface to flow about the platform or walkway forming a water tunnel and then be deflected by said surface back to the reservoir.*

*78. A method of forming a water tunnel over a platform or walkway extending through the tunnel, said method comprising the steps of:*

*providing a concave flow surface over said platform or walkway which extends partially around a longitudinal axis of said platform or walkway;*

*directing water onto the flow surface with sufficient velocity to cause the water to conform to said flow surface and form a water tunnel about said platform or walkway by traveling less than 360 degrees about said axis, before leaving the flow surface by means of an outlet therefrom.*

*79. A method as in claim 78 additionally comprising providing a reservoir, drawing water from the reservoir, directing the drawn water onto the flow surface, and returning the water from the flow surface to the reservoir.*

*80. A method as in claim 78 additionally comprising forming a sheet flow of water, and directing the sheet flow of water onto the flow surface.*

*81. A tunnel wave water sculpture comprising:*

*a reservoir for retaining water;*

*a platform or walkway disposed above the reservoir;*

*a flow surface having a generally cylindrical portion extending generally around the platform or walkway, the flow surface not forming a complete cylinder; and*

*at least one water injector for directing a flow of water onto the flow surface at a location generally adjacent a first side of the walkway in a manner so that the water flows along the flow surface over the walkway and flows into the reservoir at a location generally adjacent a second side of the walkway;*

*wherein water from the water injector flows once across the flow surface before splashing into the reservoir.*

*82. The tunnel wave water sculpture of claim 81, wherein the reservoir is generally uncovered at its top.*

*83. The tunnel wave water sculpture of claim 82, wherein the walkway or platform is supported by supports extending upward from the reservoir.*

*84. The tunnel wave water sculpture of claim 81, wherein the flow of water comprises a sheet flow.*

* * * * *